US 12,528,261 B2

(12) United States Patent
Schwab et al.

(10) Patent No.: US 12,528,261 B2
(45) Date of Patent: *Jan. 20, 2026

(54) PRODUCTION LINE FOR THE PRODUCTION OF OPHTHALMIC LENSES

(71) Applicant: Alcon Inc., Fribourg (CH)

(72) Inventors: Matthias Schwab, Amorbach (DE); Roger Biel, Aschaffenburg (DE); Matthias Braun, Kleinwallstadt (DE); Jens Eppig, Seligenstadt (DE); Shu Zong, Cumming, GA (US)

(73) Assignee: Alcon Inc., Fribourg (CH)

( * ) Notice: Subject to any disclaimer, the term of this patent is extended or adjusted under 35 U.S.C. 154(b) by 583 days.

This patent is subject to a terminal disclaimer.

(21) Appl. No.: 17/931,178

(22) Filed: Sep. 12, 2022

(65) Prior Publication Data

US 2023/0080433 A1    Mar. 16, 2023

Related U.S. Application Data

(60) Provisional application No. 63/243,955, filed on Sep. 14, 2021.

(51) Int. Cl.
*B29D 11/00* (2006.01)

(52) U.S. Cl.
CPC .. *B29D 11/00259* (2013.01); *B29D 11/00115* (2013.01); *B29D 11/00134* (2013.01); *B29D 11/0023* (2013.01)

(58) Field of Classification Search
CPC ........ B29D 11/00259; B29D 11/00115; B29D 11/00134; B29D 11/0023;

(Continued)

(56) References Cited

U.S. PATENT DOCUMENTS 5,804,107 A * 9/1998 Martin ............... B29D 11/0048
425/347
12,168,328 B2 * 12/2024 Braun .................... B29C 45/32
(Continued)

FOREIGN PATENT DOCUMENTS

EP        0686585 A2    12/1995
EP        0770474 A2     5/1997
(Continued)

*Primary Examiner* — Jacob T Minskey
*Assistant Examiner* — Elisa H Vera
(74) *Attorney, Agent, or Firm* — Sheng-Hsin Hu; Nicholas Smith

(57) ABSTRACT

An automated production line for the production of ophthalmic lenses comprises:
 a production line front end (1) comprising:
  a first injection-molding machine (10) and a second injection-molding machine (12)
  a casting module (14) comprising
  a filling station (144) and a capping station (145);
  a stacking module (15) and a curing module (16);
  a destacking module (17) and a demolding and delensing module
 a production line back end (2) comprising:
 a scalable treatment module (20);
 an inspection module (21);
 a primary packaging module (22),
Wherein the first and second injection-molding machines allow for a quick exchange of the tooling plates used in the injection molding machine without the need to decrease the temperature of the injection molding machine by pre-configured tooling plates.

9 Claims, 24 Drawing Sheets

(58) Field of Classification Search
CPC ........ B29D 11/00038; B29D 11/00173; B29D 11/00192; B29D 11/0098; B29D 11/00067; B29D 11/0024; B29D 11/0025; B29D 11/00865; B29C 45/26; B29C 33/3842; B29C 33/40; B29C 45/32; B29C 45/42; B29C 2045/4078; B29K 2083/00; B29K 2105/0061; B29K 2823/10; B65B 25/008; B29L 2011/004
See application file for complete search history.

(56) References Cited

U.S. PATENT DOCUMENTS

| | | | |
|---|---|---|---|
| 2007/0150086 A1* | 6/2007 | Wadding | B29D 11/00125 |
| | | | 700/115 |
| 2013/0040014 A1* | 2/2013 | Yang | B29C 45/2673 |
| | | | 425/443 |
| 2016/0176091 A1 | 6/2016 | Gibson et al. | |
| 2016/0176092 A1* | 6/2016 | Atkinson | B65B 55/02 |
| | | | 53/425 |

FOREIGN PATENT DOCUMENTS

| | | |
|---|---|---|
| GB | 2537147 A | 10/2016 |
| WO | 03016855 A1 | 2/2003 |
| WO | 2007042280 A1 | 4/2007 |
| WO | 2009103732 A1 | 8/2009 |
| WO | 2011026868 A1 | 3/2011 |
| WO | 2018178823 A1 | 10/2018 |
| WO | 2018185630 A1 | 10/2018 |
| WO | 2019180679 A1 | 9/2019 |
| WO | 2020084573 A1 | 4/2020 |
| WO | 2020109976 A1 | 6/2020 |
| WO | 2020144622 A1 | 7/2020 |

* cited by examiner

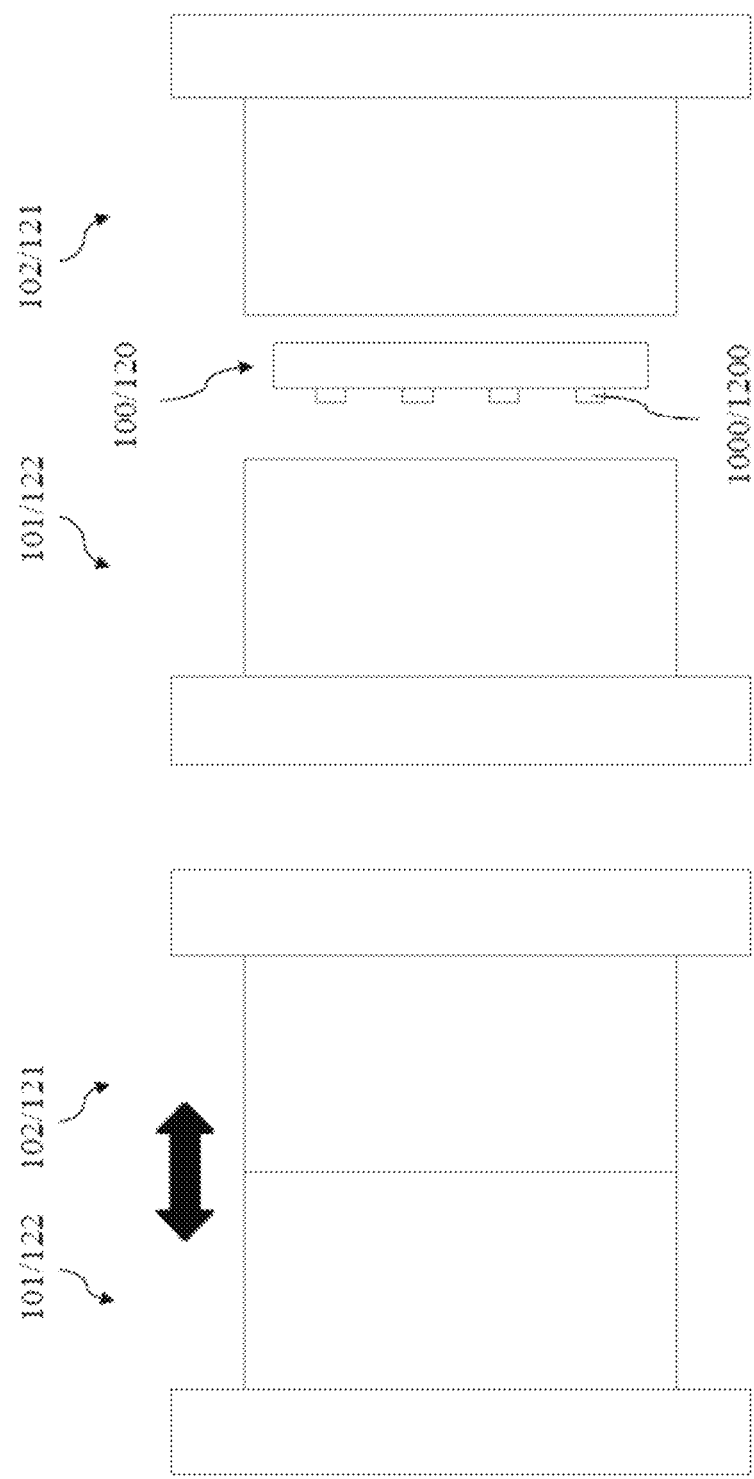

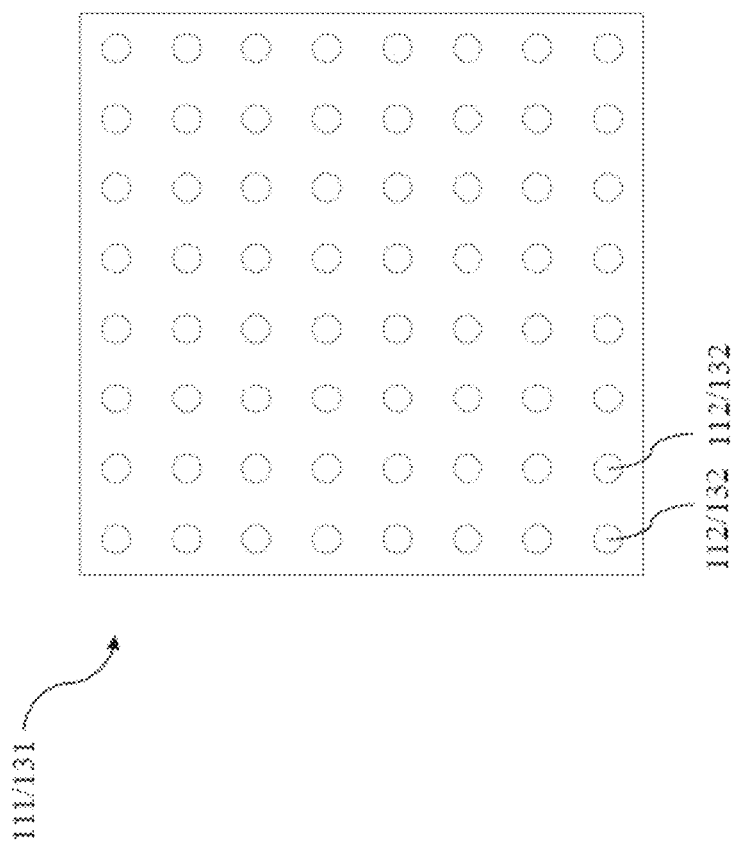

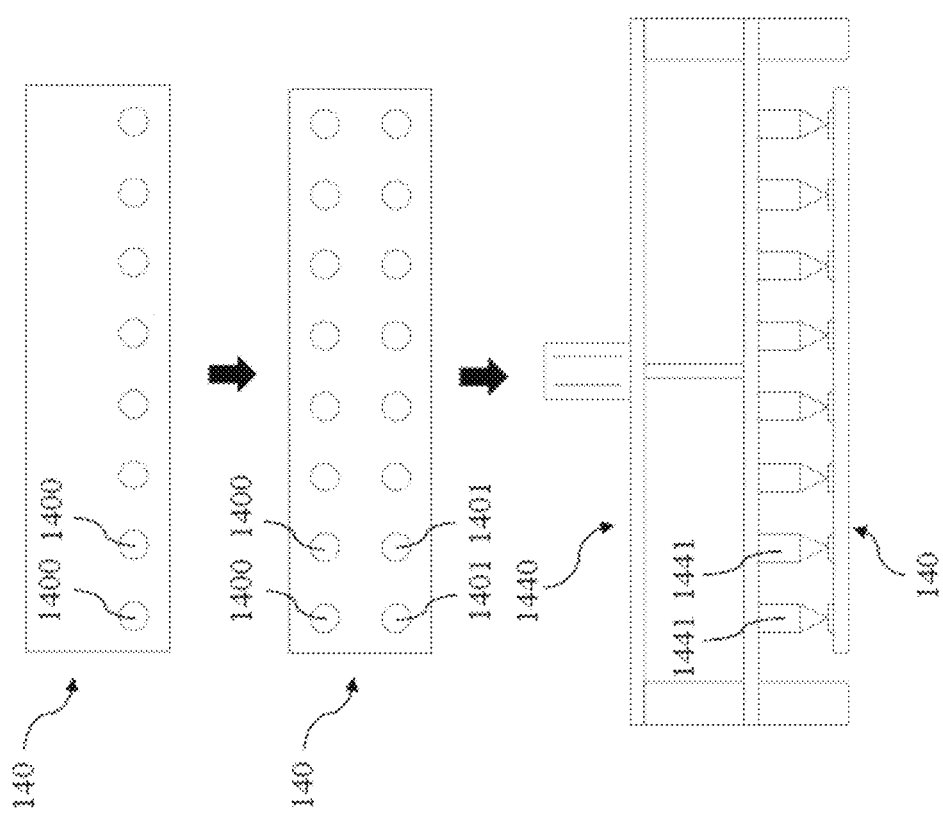

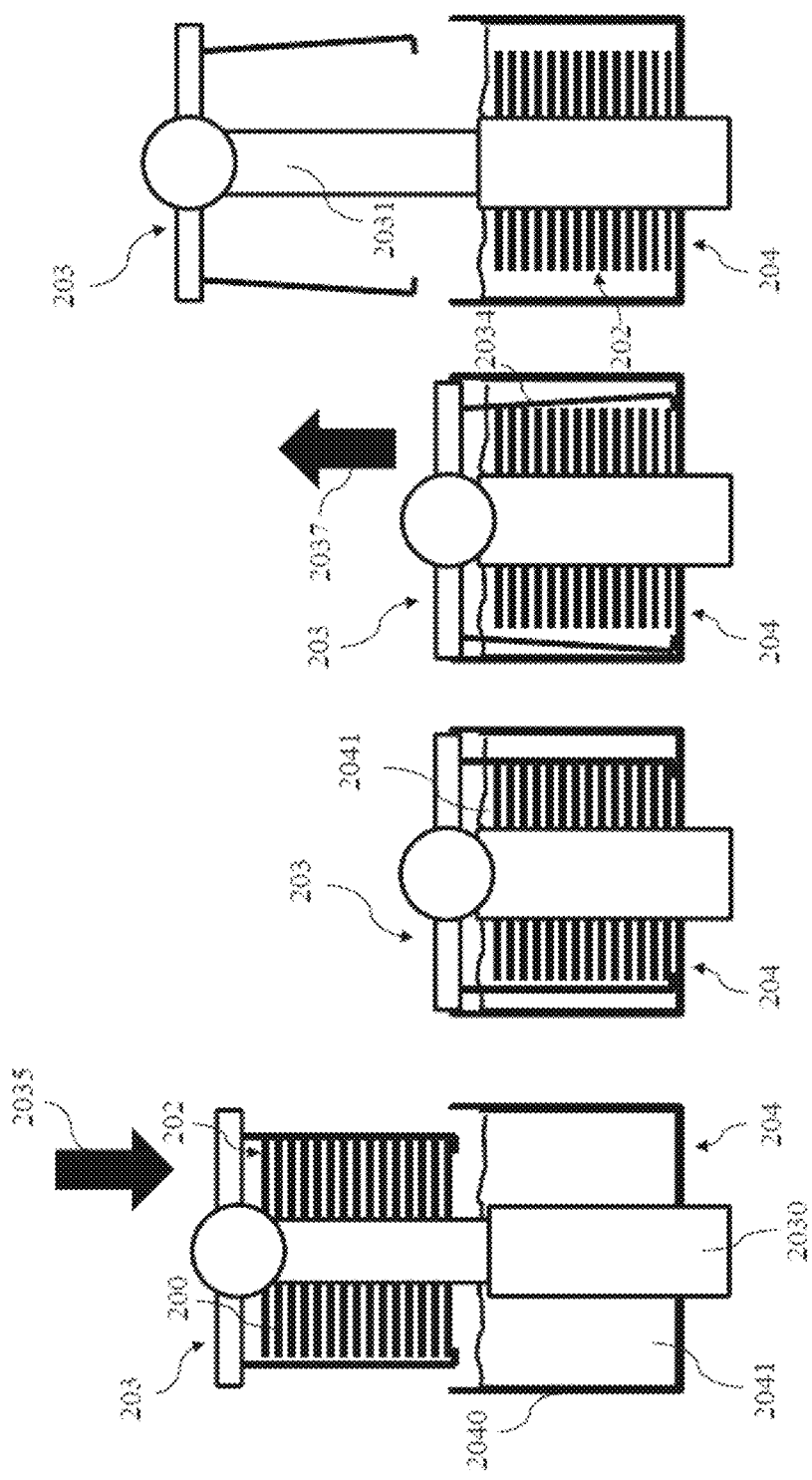

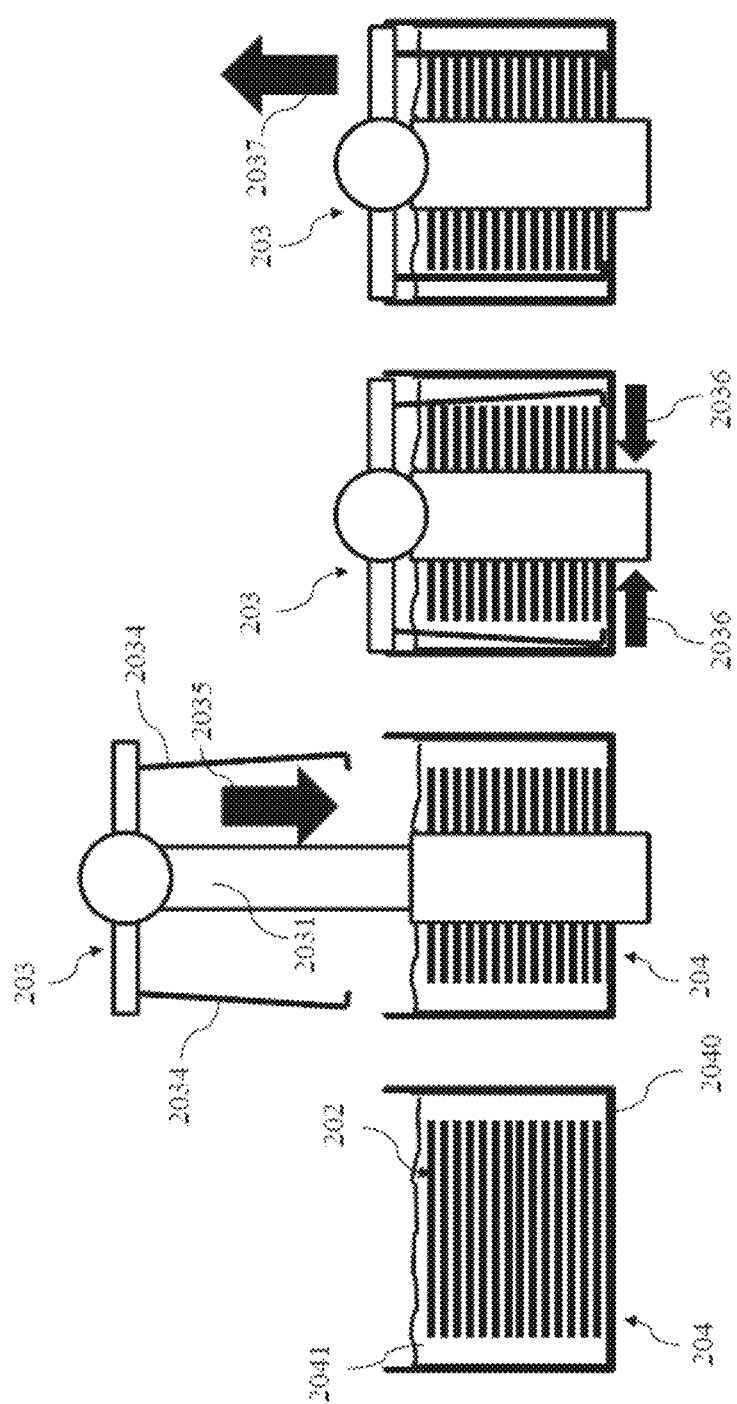

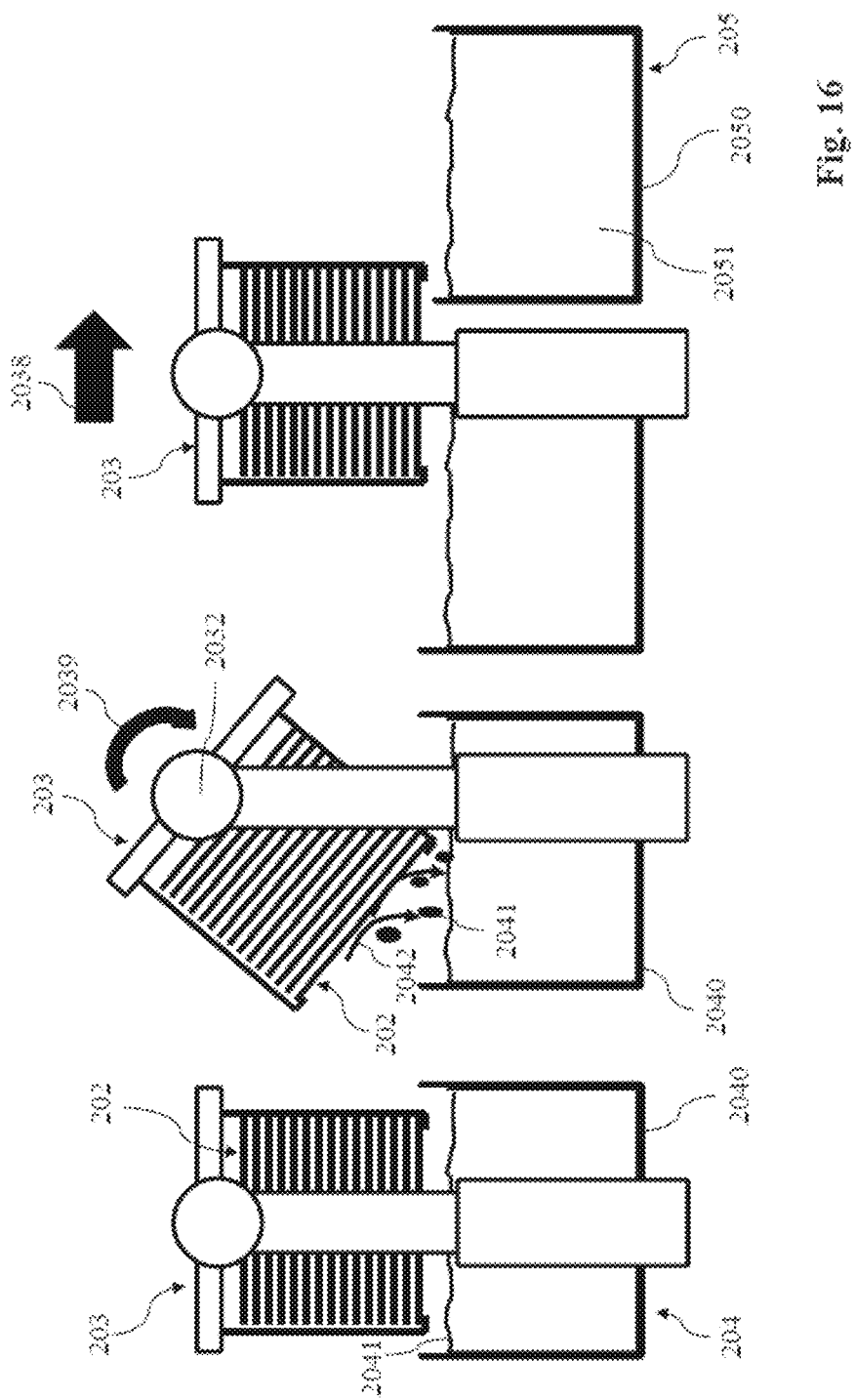

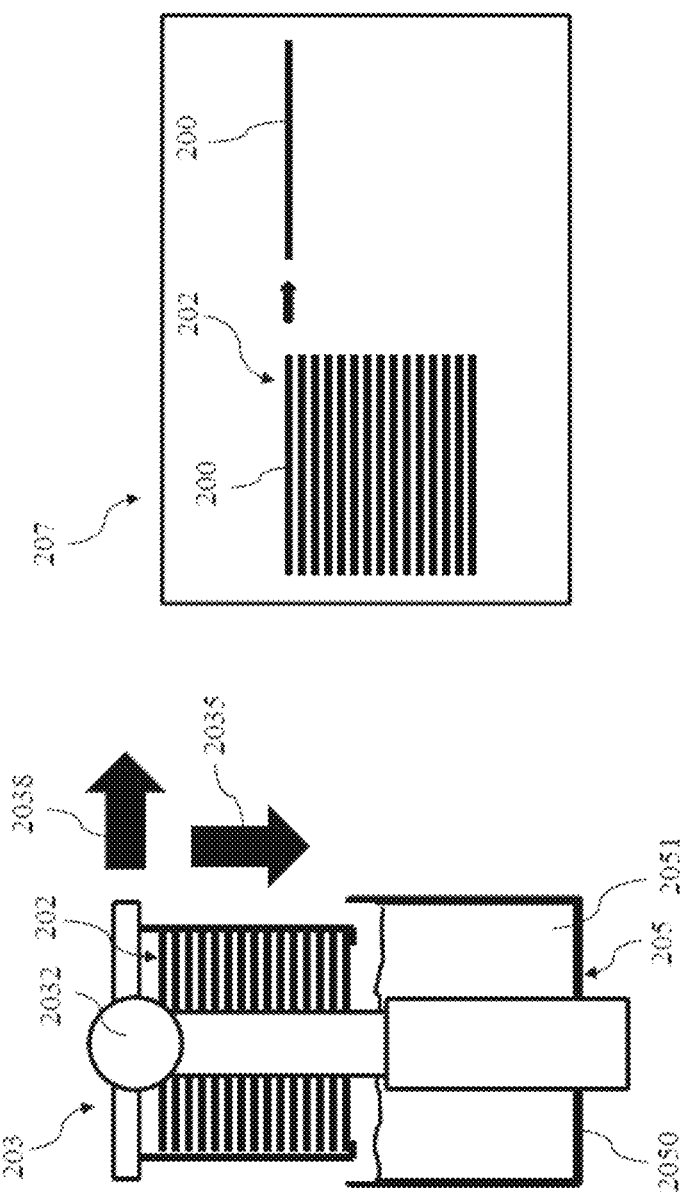

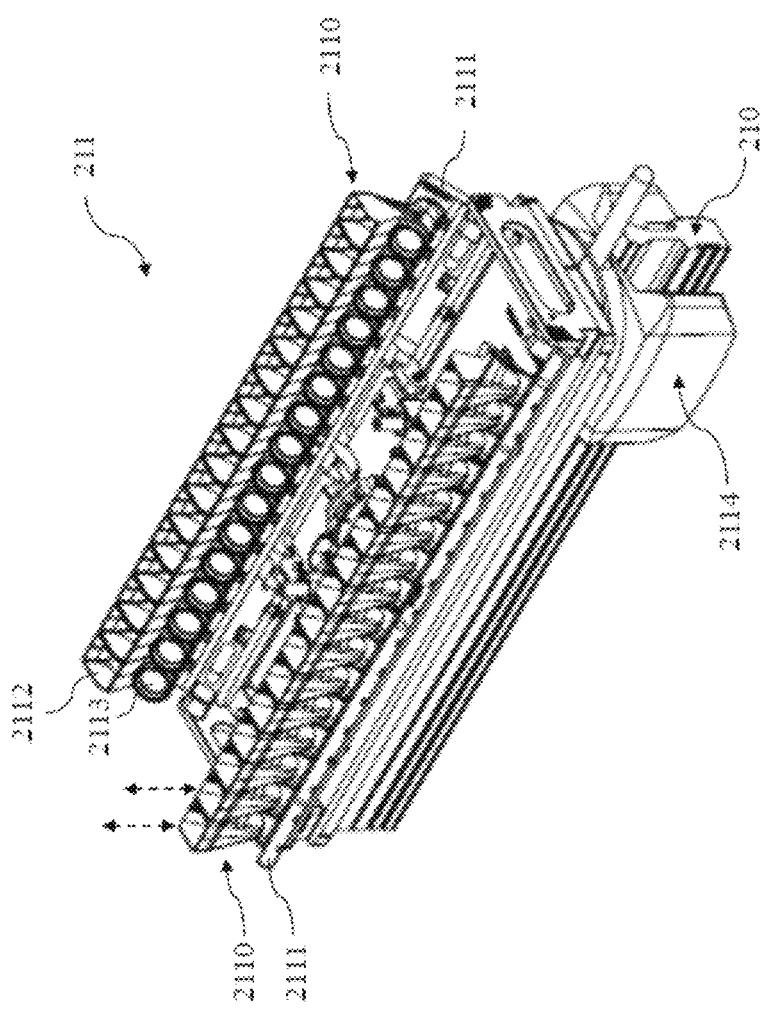

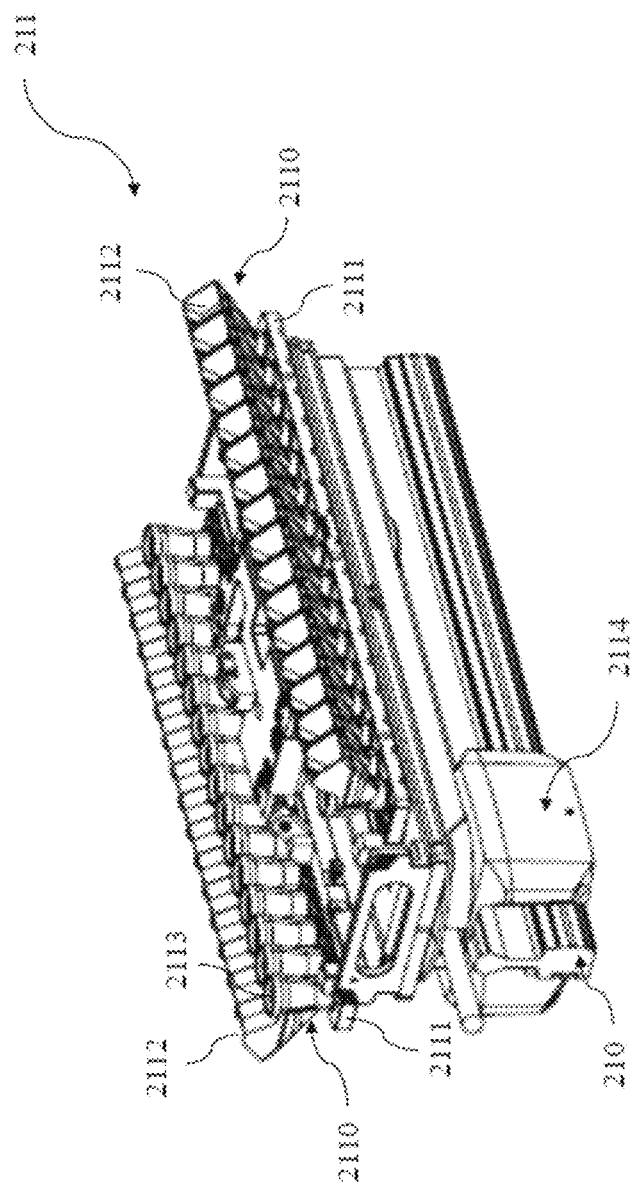

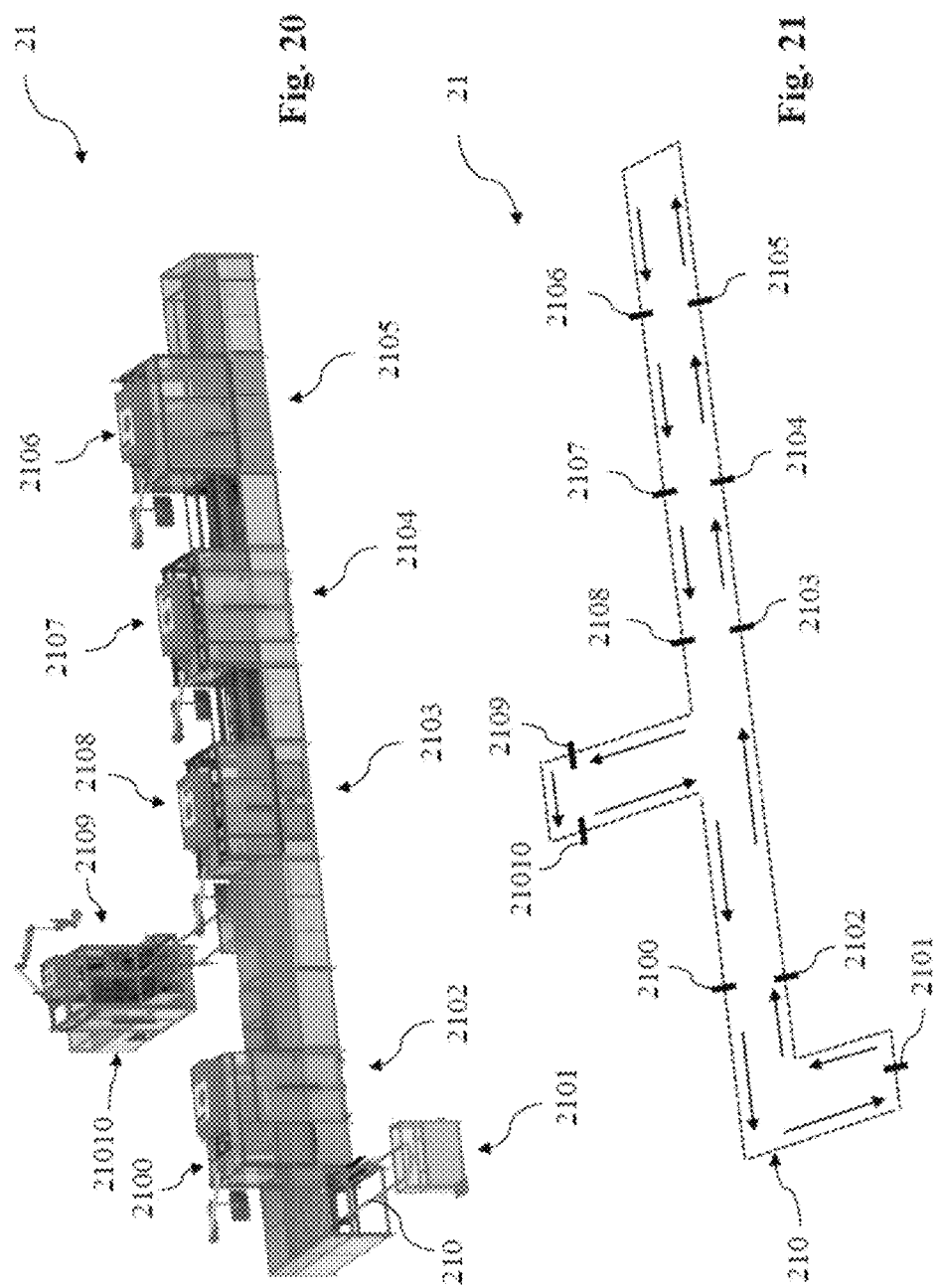

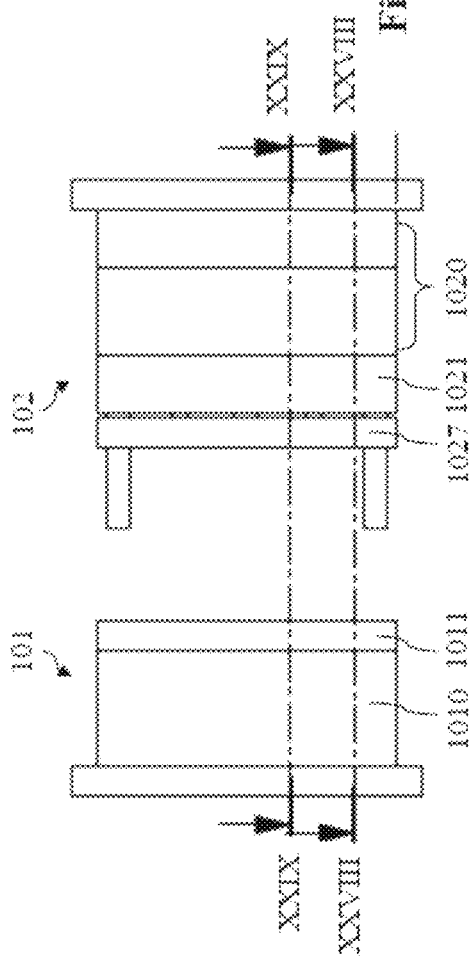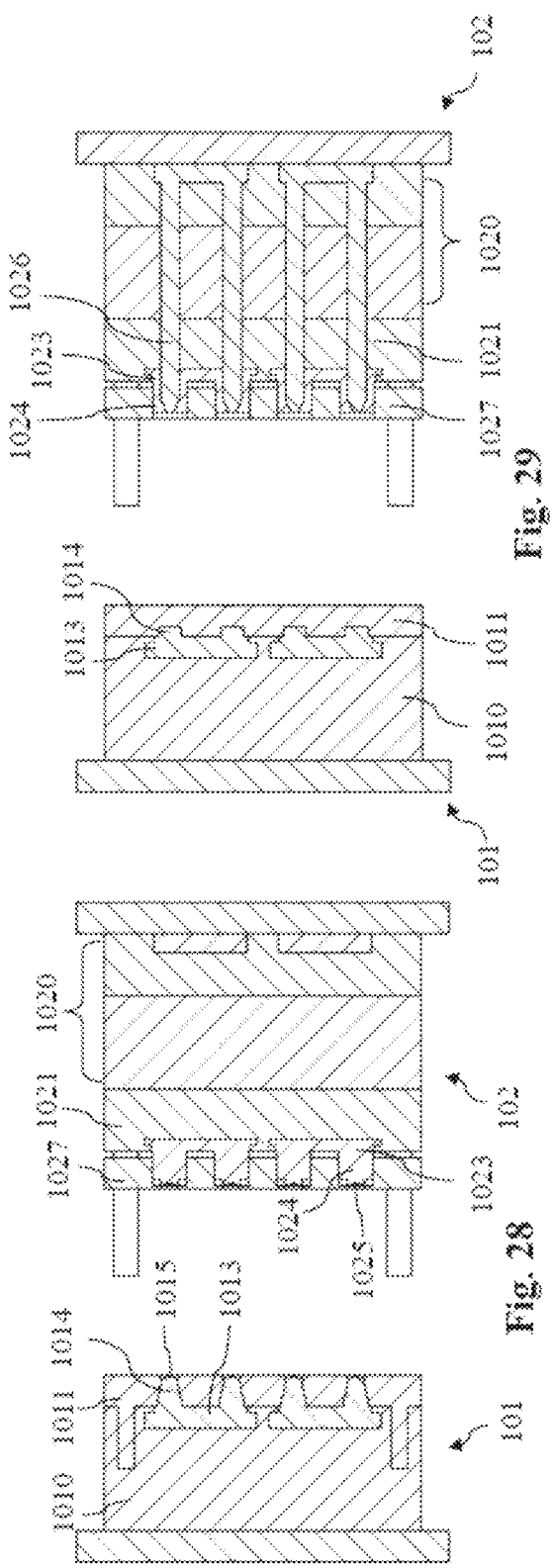

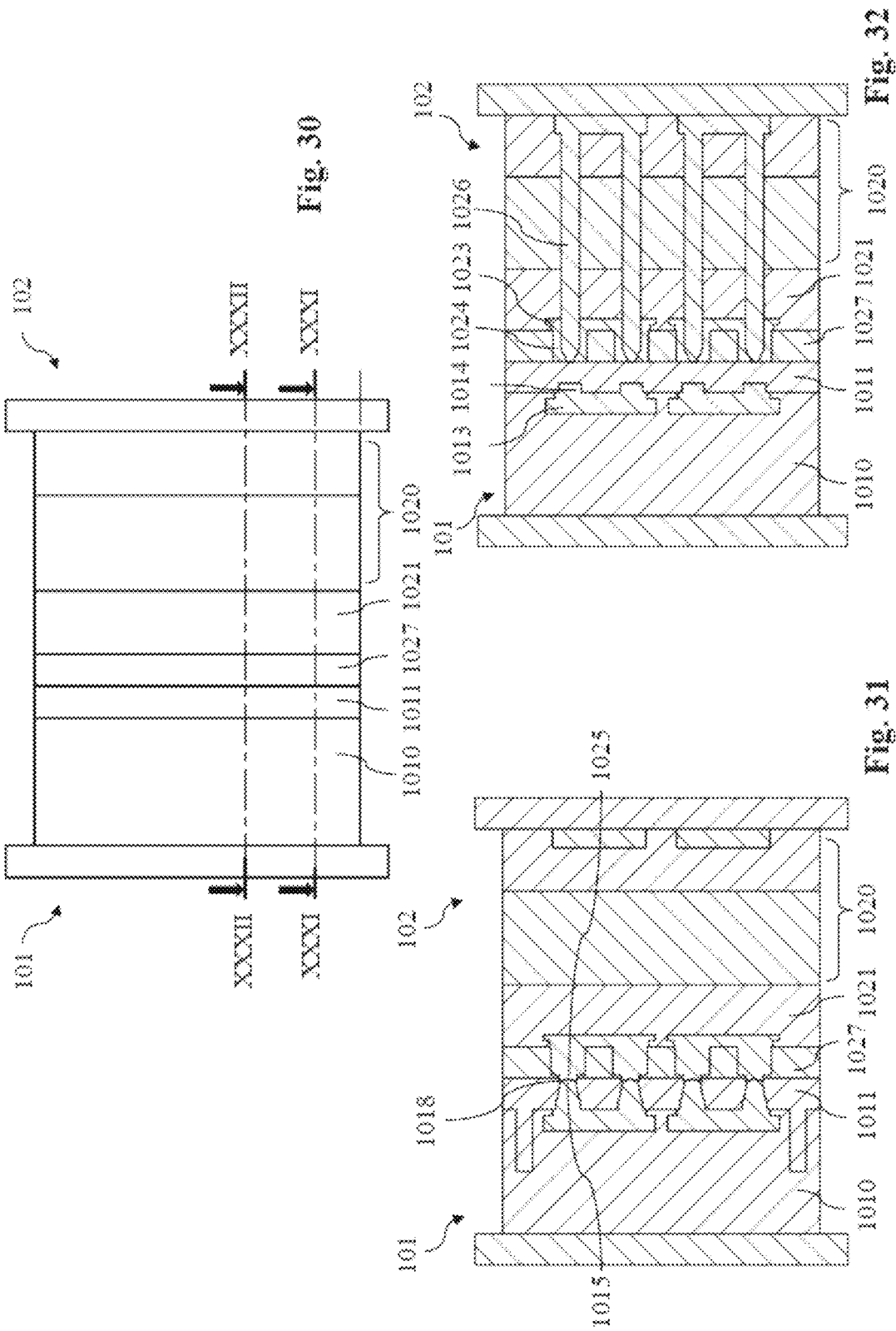

PRODUCTION LINE FOR THE PRODUCTION OF OPHTHALMIC LENSES

FIELD

The present invention generally deals with the manufacture of ophthalmic lenses, in particular contact lenses such as soft contact lenses, for example silicone hydrogel contact lenses. More specifically, the invention deals with a production line for the manufacture of such lenses using plastic lens molds which are produced using injection-molding techniques.

BACKGROUND

Contact lenses, in particular soft contact lenses such as silicone hydrogel contact lenses, are produced using mass-manufacturing techniques, in particular since these contact lenses are typically worn only once (single use) and are subsequently disposed of. Obviously, therefore, very large numbers of such contact lenses must be produced in more or less fully automated mass-manufacturing production lines. In this regard, two general types of fully automated production lines are known which are fundamentally different regarding the type of lens molds used for forming the contact lenses.

In the first type of production line, the lens molds for forming the contact lenses are re-usable and are actually used thousands of times in the production line before they are removed from the production line and replaced by different re-usable lens molds. This means that after one contact lens has been produced using these lens molds, these re-usable lens molds are cleaned, rinsed and dried in the production line, and are subsequently used again in the next production run to form the next contact lens. Such re-usable lens molds are typically made of glass, e.g. quartz glass, and are very expensive (this is one reason why the glass lens molds must be re-used to produce large numbers of contact lenses), and curing of the lens-forming material may be effected with the aid of UV-light and UV-photoinitiators contained in the lens-forming material, these UV-photoinitiators triggering photopolymerization and/or crosslinking of the lens-forming material (which may be a monomer or a prepolymer) upon being exposed to UV-light to form the contact lenses.

In the second type of production line, the lens molds for forming the contact lenses are single-use lens molds. This means that after one contact lens has been produced in one production run using such single-use lens mold, the same lens mold is not used anymore, but rather a new single-use lens mold is used in the next production cycle for producing the next contact lens. The used lens molds are typically returned to the recycling process after having been used. Obviously, since the lens molds are used only once they must be cheap both with respect to the material the lens molds are made of as well as with respect to the process of their manufacture. Nevertheless, they must be capable of producing contact lenses of top quality. Single-use lens molds are plastic lens molds which are typically made of polyolefines, in particular polypropylene, and they can be reliably and cost-effectively produced using injection-molding machines.

In injection-molding machines, a flowable hot thermoplastic material is injected at high pressure into casting dies through so-called hot runners (i.e. channels or pipes through which the flowable hot thermoplastic material is injected). The casting dies are shaped such that after curing of the hot thermoplastic material in the casting dies by cooling down, the plastic lens molds having the desired geometry (defined by the casting dies) are formed. Typically, an injection-molding machine comprises two tool halves which are movable towards and away from each other. When the two tool halves are moved towards each other until they are in a closed position, the casting dies are formed between the two tool halves and the flowable hot thermoplastic material is injected into the casting dies at high pressure. After the flowable hot thermoplastic material has cooled down to form the plastic lens molds, the two tool halves are moved away from each other to an open position that allows for the removal of the plastic lens molds once they have been formed.

Thousands of such single use plastic lens molds are produced in injection-molding machines or apparatuses which are arranged separate from the contact lens production lines. Typically, large numbers of plastic lens molds having different geometries are produced and stored until they are needed to produce contact lenses having the respective geometries whereupon the respective plastic lens molds needed are supplied to the production lines.

Known production lines using plastic lens molds are capable of producing only one lot (a first lot) of contact lenses at a time, that is to say the contact lenses produced at a time all have the same properties. This means that the plastic lens molds supplied to the production line to produce this one lot of contact lenses all have the same specifications (e.g. geometry, lens-forming material, etc.). These plastic lens molds are actually supplied to the production line some time before starting production of this lot of contact lenses, since the environmental conditions (room temperature, relative humidity, etc.) under which the plastic lens molds are produced may be different from the environmental conditions under which the plastic lens molds are stored. Once production is started, only contact lenses of this one lot are concurrently produced in the production line.

If the contact lenses of another lot (a second lot) are to be produced subsequently, i.e. contact lenses having a geometry different from the geometry of the contact lenses of the first lot, any plastic lens molds for the production of contact lenses of the first lot must be removed from the production line, and plastic lens molds needed for the production of the second lot of contact lenses must be supplied. Again, the plastic lens molds needed for the production of the second lot of contact lenses are actually supplied some time before starting production of the second lot of contact lenses. Thereafter, only the contact lenses of the second lot (again all having the same geometry which is, however, different from the geometry of the contact lenses of the first lot) are then concurrently produced.

Typically, there is a time interval (a gap) between the production of the last contact lens of the first lot and the production of the first contact lens of the second lot. Such a gap is indicative of the end of a preceding lot of contact lenses and the start of a subsequent lot of contact lenses.

The afore-described production lines using plastic lens molds suffer from a number of disadvantages. First of all, these production lines are capable of concurrently producing only the same type of contact lens, i.e. the lens-forming material as well as the lens manufacturing process are identical for all contact lenses produced in the same production line. Second, large stocks of plastic lens molds having different geometries must be kept at the contact lens manufacturer in order to at all times be in a position to produce the contact lenses of the different geometries contained in a particular production order. In case one of the geometries is not on stock, or the number of plastic lens molds on stock having a particular geometry is lower than the number contained in the production order, the respective production order cannot be executed. And third, the known production lines are not very flexible. For example, in case a production order comprises contact lenses having different geometries (as this is practically always the case), the contact lenses of the different geometries need to be produced one after the other (by geometry). This may lead to an inefficient use of the production line, as the lot change is cumbersome and time-consuming. Contact lenses using a different lens-forming material must be produced on a different production line as the production process (e.g. curing parameters, chemical treatment parameters, etc.) are different so that they cannot be produced by the same production line.

It is therefore an object to suggest a production line and method using plastic lens molds produced by injection-molding which overcome the afore-mentioned disadvantages and allow for a very efficient production of ophthalmic lenses, in particular contact lenses such as soft contact lenses, for example silicone hydrogel contact lenses.

SUMMARY

In order to achieve the afore-mentioned object, the present invention suggests a production line and a method as specified by the features of the independent claim of the respective category. Advantageous aspects of the production line and method according to the invention are the subject of the respective dependent claims.

In one aspect, the invention relates to an automated production line for the production of ophthalmic lenses, in particular contact lenses such as soft contact lenses, for example silicone hydrogel contact lenses. The production line comprises:
- a production line front end comprising:
  - a first injection-molding machine arranged in the production line and configured to concurrently produce a plurality of front curve plastic lens molds within a predetermined cycle time of less than ten seconds, in particular less than five seconds, and preferably in two to five seconds;
  - a second injection-molding machine arranged in the production line and configured to concurrently produce a corresponding plurality of base curve plastic lens molds within the same predetermined cycle time of less than ten seconds, in particular less than five seconds, and preferably in two to five seconds;
  - a casting module comprising
    - a filling station configured to dose a predetermined amount of lens-forming material into a predetermined number of the front curve plastic lens molds,
    - a capping station configured to place a corresponding number of the base curve plastic lens molds having the same age as the predetermined number of front curve plastic lens molds on the predetermined number of front curve plastic lens molds containing the predetermined amount of lens-forming material, to form a corresponding number of closed plastic lens molds containing the lens-forming material;
  - a first transfer robot configured to transfer the corresponding number of closed plastic lens molds containing the lens-forming material from the casting module to
  - a stacking module comprising
    - a plurality of lens mold trays, each lens mold tray configured for being loaded with a multiple of the corresponding number of closed plastic lens molds transferred by the first transfer robot and containing the lens-forming material,
    - a stacking robot for stacking a plurality of lens mold trays loaded with the closed plastic lens molds containing the lens-forming material to form a stack of lens mold trays;
  - a curing module comprising
    - a plurality of ovens,
    - a stack handling robot,
    - wherein each individual oven of the plurality of ovens comprises a heatable chamber sized to accommodate a said stack of lens mold trays carrying the closed plastic lens molds as well as a door for opening and closing the chamber, to allow the stack handling robot to load a said stack of lens mold trays loaded with the closed plastic lens molds containing the lens-forming material into the heatable chamber when the door is open, to allow the heatable chamber to be heated to a predetermined temperature to effect curing of the lens-forming material to form cured lenses in the closed plastic lens molds on the individual lens mold trays of the stack when the door is closed, and to allow the stack handling robot to remove a said stack of lens mold trays loaded with the closed plastic lens molds containing the cured lenses from the chamber when the door is open again, and;
  - a destacking module comprising a destacking robot configured to destack the individual lens mold trays from the stack of lens mold trays removed from the chamber of a said oven for allowing access to the closed plastic molds of each individual lens mold tray;
  - a second transfer robot configured to transfer a predetermined number of the closed plastic lens molds containing the cured lenses from a said individual lens mold tray to
  - a demolding and delensing module comprising
    - a demolding station configured to open the predetermined number of closed plastic lens molds by separating the base curve plastic lens molds and the front curve plastic lens molds from each other, with the cured lenses adhering either to the base curve plastic lens molds or to the front curve plastic lens molds,
    - a delensing station configured to release the cured lenses from the base curve plastic lens molds or from the front curve plastic lens molds,
    - a transfer gripper configured to transfer the cured lenses released from the delensing station to a treatment carrier tray;
- a production line back end comprising:
  - a treatment module for a liquid bath treatment of the cured lenses carried by the treatment carrier tray to obtain the ophthalmic lenses;
  - an inspection module for the inspection of the ophthalmic lenses; and
  - a primary packaging module for packaging those ophthalmic lenses that have successfully passed the inspection in primary packaging containers.

According to an aspect of the production line according to the invention, the first injection-molding machine comprises a first tool half and a second tool half, the first tool half and the second tool half being movably arranged relative to one another between a closed position for injection-molding of the front curve plastic molds and an open position for removal of the molded front curve plastic molds, the first tool half comprises a first tooling plate to which a plurality of individual first sleeves are pre-mounted, each of the individual first sleeves having an individual optical tool insert mounted thereto that determines the shape of a concave optical front surface of the front curve plastic lens mold formed by the individual optical tool insert, and the second tool half comprises a second tooling plate to which a plurality of individual second sleeves are pre-mounted, each of the individual second sleeves having an individual back piece insert mounted thereto that determines the shape of a convex back surface of the front curve plastic lens mold formed by the individual back piece insert, the first tool half further comprises a first slot accommodating the first tooling plate, the first slot allowing to mount the first tooling plate by sliding the first tooling plate into the first slot and then fixing the first tooling plate, and allowing to demount the first tooling plate by unfixing the first tooling plate and then pulling the first tooling plate out of the first slot, and the second tool half further comprises a second slot accommodating the second tooling plate, the second slot allowing to mount the second tooling plate by sliding the second tooling plate into the second slot and then fixing the second tooling plate, and allowing to demount the second tooling plate by unfixing the second tooling plate and then pulling the second tooling plate out of the second slot;

and the second injection-molding machine comprises a third tool half and a fourth tool half, the third tool half and the fourth tool half being movably arranged relative to one another between a closed position for injection-molding of the base curve plastic lens molds and an open position for removal of the molded base curve plastic lens molds, the third tool half comprises a third tooling plate to which a plurality of individual third sleeves are pre-mounted, each of the individual third sleeves having an individual optical tool insert mounted thereto that determines the shape of a convex optical front surface of the base curve plastic lens mold formed by the individual optical tool insert, and the fourth tool half comprises a fourth tooling plate to which a plurality of individual fourth sleeves are pre-mounted, each of the individual fourth sleeves having an individual back piece insert mounted thereto that determines the shape of the concave back surface of the base curve plastic lens mold formed by the individual back piece insert, the third tool half further comprises a third slot accommodating the third tooling plate, the third slot allowing to mount the third tooling plate by sliding the third tooling plate into the third slot and then fixing the third tooling plate, and allowing to demount the third tooling plate by unfixing the third tooling plate and then pulling the third tooling plate out of the third slot, and the fourth tool half further comprises a fourth slot accommodating the fourth tooling plate, the fourth slot allowing to mount the fourth tooling plate by sliding the fourth tooling plate into the fourth slot and then fixing the fourth tooling plate, and allowing to demount the fourth tooling plate by unfixing the fourth tooling plate and then pulling the fourth tooling plate out of the fourth slot.

In accordance with a further aspect of the production line according to the invention, the first tool half comprises a first fixed block comprising the first slot accommodating the first tooling plate to which the individual first sleeves are pre-mounted, a first alignment plate releasably mounted to the first fixed block, the first alignment plate being provided with a plurality of separate first through-openings, with each separate first through-opening of the first alignment plate accommodating therein one individual first sleeve of the plurality of individual first sleeves for aligning the one individual first sleeve, the first alignment plate being movable away from the first fixed block when being unmounted from the first fixed block to allow for sliding the first tooling plate into the first slot or pulling the first tooling plate out of the first slot;

and the second tool half comprises a second fixed block comprising a plurality of hot runner pipes arranged therein for the injection of a thermoplastic material, the hot runner pipes extending out of the second fixed block towards the first tool half, a mounting plate releasably mounted to the second fixed block, the mounting plate comprising the second slot accommodating the second tooling plate with the pre-mounted individual second sleeves, the mounting plate, the second tooling plate and the individual second sleeves each comprising hot runner through-holes accommodating therein the hot runner pipes extending out of the second fixed block, the mounting plate being movable away from the second fixed block when being unmounted from the second fixed block to allow for sliding the second tooling plate into the second slot or pulling the second tooling plate out of the second slot, a second alignment plate movably mounted towards and away from the mounting plate, the second alignment plate being provided with a plurality of separate second through-openings, with each separate second through-opening accommodating therein one individual second sleeve of the plurality of individual second sleeves for aligning the one individual second sleeve.

In accordance with still a further aspect of the production line according to the invention, the third tool half comprises a third fixed block comprising a plurality of hot runner pipes arranged therein for the injection of a thermoplastic material, the hot runner pipes extending out of the third fixed block towards the fourth tool half, a mounting plate releasably mounted to the third fixed block, the mounting plate comprising the third slot accommodating the third tooling plate with the pre-mounted individual third sleeves, the mounting plate, the third tooling plate and the individual third sleeves each comprising hot runner through-holes accommodating therein the hot runner pipes extending out of the third fixed block, the mounting plate being movable away from the third fixed block when being unmounted from the third fixed block to allow for sliding the third tooling plate into the third slot or pulling the third tooling plate out of the third slot, a third alignment plate movably mounted towards and away from the mounting plate, the third alignment plate being provided with a plurality of separate third through-openings, with each separate third through-opening accommodating therein one individual third sleeve of the plurality of individual third sleeves for aligning the one individual third sleeve;

and the fourth tool half comprises
a fourth fixed block comprising the fourth slot accommodating the fourth tooling plate to which the individual fourth sleeves are pre-mounted,
a fourth alignment plate releasably mounted to the fourth fixed block, the fourth alignment plate being provided with a plurality of separate fourth through-openings, with each separate fourth through-opening of the fourth alignment plate accommodating therein one individual fourth sleeve of the plurality of individual fourth sleeves for aligning the one individual fourth sleeve, the fourth alignment plate being movable away from the fourth fixed block when being unmounted from the fourth fixed block to allow for sliding the fourth tooling plate into the fourth slot or pulling the fourth tooling plate out of the fourth slot.

According to yet a further aspect of the production line according to the invention, the production line front end further comprises:
a front curve plastic lens mold buffer module arranged between the first injection-molding machine and the casting module, the front curve plastic lens mold buffer module being configured to store the front curve plastic lens molds removed from the first injection-molding machine for a first predetermined cooling time period at predetermined environmental conditions until the front curve plastic molds are transferred to the casting module;
a base curve plastic lens mold buffer module arranged between the second injection-molding machine and the casting module, the base curve plastic lens mold buffer module being configured to store the base curve plastic lens molds removed from the second injection-molding machine for a second predetermined cooling time period at the same predetermined environmental conditions as the front curve plastic lens molds until the base curve plastic lens molds are transferred to the casting module;
wherein the casting module is configured to have the same predetermined environmental conditions as have the base curve plastic mold buffer module and the front curve plastic mold buffer module, and wherein the capping station is configured to place only such base curve plastic lens molds onto the front curve plastic lens molds for which the same time period has elapsed between the removal of the front curve plastic lens molds from the first injection-molding machine and the removal of the base curve plastic lens molds from the second injection-molding machine.

According to a further aspect of the production line according to the invention, the casting module further comprises a toric angle verification station arranged downstream of the capping station, the toric angle verification station comprising a camera.

In accordance with still a further aspect of the production line according to the invention, the demolding and delensing module comprises one of
a front curve demolding and delensing branch for opening the closed plastic lens molds containing the cured lenses and for picking the cured lenses up from the front curve plastic lens molds;
a base curve demolding and delensing branch for opening the closed plastic lens molds containing the cured lenses and for picking the cured lenses up from a temporary carrier;
wherein the front curve demolding and delensing branch comprises
a lens pre-release station comprising mechanical stamps for pressing against the back surface of the base curve plastic lens molds to release the cured lenses from the base curve plastic lens molds,
the demolding station for opening the plastic lens molds, and
the delensing station, the delensing station comprising pins for pressing against the back surfaces of the front curve plastic lens molds to release the cured lenses from the front curve plastic lens molds, to allow the released cured lenses to be transferred by the transfer gripper to the treatment carrier tray;
wherein the base curve demolding and delensing branch comprises
the demolding station for opening the closed plastic lens molds, the demolding station comprising pins for pressing against the back surfaces of the front curve plastic lens molds to release the cured lenses from the front curve plastic lens molds;
the delensing station comprising receiver grippers arranged beneath the base curve plastic lens molds and ultrasonic horns for applying ultrasonic waves to the back surfaces of the base curve plastic lens molds to release the cured lenses from the base curve plastic lens molds and allow them to be received by the receiver grippers arranged beneath the base curve plastic lens molds, to allow the received cured lenses to be transferred by the transfer gripper to the treatment carrier tray.

According to still a further aspect of the production line according to the invention, the treatment module of the production line back end comprises:
a treatment carrier tray stacking station for stacking a plurality of individual treatment carrier trays one above the other to form a stack of treatment carrier trays carrying the cured lenses;
a plurality of treatment baths, each treatment bath of the plurality of treatment baths comprising a tank sized to accommodate a said stack of treatment carrier trays and containing a treatment liquid selected from the group of water (buffered or unbuffered), an organic extraction liquid, a coating liquid, or mixtures thereof;
a handling robot configured to pick the stack of treatment carrier trays and to place the said stack of treatment carrier trays into a first treatment bath of the plurality of treatment baths for a predetermined period of time, further configured to remove the said stack of treatment carrier trays from the first treatment bath after the predetermined period of time and lift the stack of treatment carrier trays to a position above the tank of the first treatment bath, further configured to tilt the lifted stack of treatment carrier trays about a pivot shaft with the tilted stack of treatment carrier trays still being arranged above the tank of the first treatment bath to allow the treatment liquid remaining in the stack of treatment carrier trays to flow back from the tilted stack of treatment carrier trays into the tank of the first treatment bath, further configured to tilt the lifted stack of treatment carrier trays back, and further configured to move the stack of treatment carrier trays from the first treatment bath to a second treatment bath of the plurality of treatment baths or to an ophthalmic lens transfer station where the individual treatment carrier trays of the stack of treatment carrier trays are destacked and the ophthalmic lenses obtained by the liquid bath treatment of the cured lenses are transferred from the destacked individual treatment carrier trays to the inspection module.

In accordance with another aspect of the production line according to the invention, the inspection module of the production line back end comprises:
 a closed-loop rail having a geometric shape that can be freely determined so as to fit in the space defined by a room where the closed-loop rail is arranged,
 a plurality of self-driving shuttles arranged on the closed-loop rail, each self-driving shuttle carrying a plurality of inspection cuvettes arranged thereon;
 a plurality of stations arranged along the closed-loop rail, the plurality of stations comprising the following individual stations arranged along the closed-loop rail in the following sequence
  a cuvette filling station configured to fill the plurality of cuvettes with water, the plurality of cuvettes being arranged on a said shuttle in a handling position,
  a lens insertion station configured to insert the ophthalmic lenses transferred from the treatment module into the plurality of filled cuvettes arranged on the shuttles, one said ophthalmic lens into one said cuvette,
  a first cuvette tilting station configured to tilt the plurality of cuvettes arranged on the shuttle from the handling position to an inspection position,
  a lens inspection station configured to inspect the ophthalmic lenses in the plurality of cuvettes,
  a first cuvette tilting-back station for tilting the plurality of cuvettes containing the inspected ophthalmic lenses from the inspection position back to the handling position,
  an ophthalmic lens transfer station for transferring those inspected ophthalmic lenses that have successfully passed the inspection to the primary packaging module,
  a cuvette cleaning station for sucking the water (and possibly any ophthalmic lenses that have remained in the cuvettes, for example ophthalmic lenses that have failed the inspection) from the plurality of cuvettes.

In accordance with still a further aspect of the production line according to the invention, the inspection module further comprises the following stations arranged between the lens insertion station and the first cuvette tilting station:
 an initial cuvette tilting station for tilting the cuvettes containing the ophthalmic lenses inserted in the lens insertion station to the inspection position,
 an inversion detection station configured to detect whether or not an ophthalmic lens contained in the cuvette is inverted,
 an initial tilting-back station for tilting the cuvettes back to the handling position,
 a re-inverting station for re-inverting ophthalmic lenses which are inverted.

Another aspect of the invention relates to a method for the automated production of ophthalmic lenses, in particular contact lenses such as soft contact lenses, for example silicone hydrogel contact lenses. The method is capable of being carried out in a production line according to the invention and comprises the steps of:
 concurrently producing a plurality of front curve plastic lens molds by injection-molding the front curve plastic lens molds in the production line within a predetermined cycle time of less than ten seconds, in particular less than five seconds, and preferably in two to five seconds;
 concurrently producing a corresponding plurality of base curve plastic lens molds by injection-molding the base curve plastic lens molds in the production line within the same predetermined cycle time of less than ten seconds, in particular less than five seconds, and preferably in two to five seconds;
 filling a predetermined amount of a lens-forming material into a predetermined number of the front curve plastic lens molds;
 placing a corresponding number of base curve plastic lens molds having the same age as the predetermined number of front curve plastic lens molds onto the front curve plastic lens molds containing the lens-forming material to form a corresponding number of closed plastic lens molds containing the lens-forming material;
 transferring the corresponding number of closed plastic lens molds containing the lens-forming material and placing them onto a lens mold tray;
 stacking a plurality of lens mold trays loaded with the closed plastic lens molds containing the lens-forming material to form a stack of lens mold trays;
 loading the stack of lens mold trays loaded with the plastic lens molds containing the lens-forming material into a heatable chamber of an oven;
 heating the chamber of the oven to a predetermined temperature to effect curing of the lens-forming material to form cured lenses in the closed plastic lens molds;
 removing a said stack of lens mold trays loaded with the closed plastic lens molds containing the cured lenses from the chamber;
 destacking the individual trays from the stack of lens mold trays removed from the chamber for allowing access to the closed plastic molds of each individual lens mold tray;
 transferring a predetermined number of the closed plastic lens molds containing the cured lenses from a said individual lens mold tray in order for the closed molds being opened and the cured lenses being released;
 opening the closed lens molds by separating the base curve plastic lens molds and the front curve plastic lens molds from each other;
 releasing the cured lenses from the base curve plastic lens molds or the front curve plastic lens molds;
 transferring the released cured lenses to a treatment carrier tray;
 treating the cured lenses in a treatment bath to obtain the ophthalmic lenses;
 inspecting the ophthalmic lenses; and
 packaging those ophthalmic lenses that have successfully passed the inspection in primary packaging containers.

In accordance with one aspect of the method according to the invention, ophthalmic lenses having different properties are concurrently manufactured in the production line.

In accordance with a further aspect of the method according to the invention, in case the ophthalmic lenses to be manufactured by the production line are different from those presently manufactured by the production line according to the invention, at least one of the first tooling plate, the second tooling plate, the third tooling plate and the fourth tooling plate is pulled out of the first slot, the second slot, the third slot or the fourth slot, respectively, and at least one of a new first tooling plate, a new second tooling plate, a new third tooling plate and a new fourth tooling plate having optical tool inserts or back pieces mounted to the respective first sleeves, second sleeves, third sleeves and fourth sleeves pre-mounted thereto is slid into at least one of the first slot, the second slot, the third slot and the fourth slot. Inserting a 'new' tooling plate (first, second third or fourth) also includes cases in which toric ophthalmic lenses are produced and the only parameter that changes is the angle of the toric axes. In such instance, the respective tooling plate may be removed from the respective slot, the angle of the toric axes may be adjusted to the desired angle, and then the same tooling plate with the adjusted angle of the toric axes is re-inserted (still being 'new' in the sense that the parameters of the ophthalmic lenses produced using this 'new' tooling plate are different from the parameters of the ophthalmic lenses produced before).

According to still a further aspect of the method according to the invention, the toric angle of the base curve plastic molds and the front curve plastic molds relative to each other is verified prior to transferring the corresponding number of closed plastic lens molds containing the lens-forming material and placing them onto a lens mold tray.

In accordance with yet a further aspect of the method according to the invention, the method further comprises the steps of prior to treating the cured lenses in the treatment bath, stacking a plurality of individual treatment carrier trays one above the other to form a stack of treatment carrier trays carrying the cured lenses;

picking the stack of treatment carrier trays and placing the stack of treatment carrier trays into a first treatment bath for a predetermined period of time, the first treatment bath containing a treatment liquid selected from the group of water (buffered or unbuffered), an organic extraction liquid, a coating liquid, or mixtures thereof;

removing the stack of treatment carrier trays from the first treatment bath after the predetermined period of time and lifting the stack of treatment carrier trays to a position above the first treatment bath, and then pivoting the stack about a pivot shaft with the stack still being positioned above the first treatment bath to allow the treatment liquid remaining in the stack to flow back into the first treatment bath, thereafter pivoting the stack back;

moving the stack of treatment carrier trays to a second treatment bath and placing the stack into the second treatment bath, or moving the stack of treatment carrier trays to an ophthalmic lens transfer station and destacking the individual treatment carrier trays and transferring the ophthalmic lenses contained in an individual treatment carrier tray into inspection cuvettes for inspection of the ophthalmic lenses, one said ophthalmic lens into one cuvette.

The production line and method according to the invention have a number of advantages which are discussed in the following, without the discussed advantages being exhaustive.

First of all, depending on the number of plastic lens molds concurrently produced by the first and second injection-molding machines arranged in the production line during one cycle, it is possible to concurrently produce the same number of different lots of ophthalmic lenses (this being the maximum number of different lots) in the production line, as this number of different plastic lens molds is then repeatedly produced during each cycle. For example, in case of four, eight, sixteen or thirty-two plastic lens molds being produced by the first and second injection-molding machines during one cycle, it is possible to produce up to four, eight, sixteen or thirty-two different lots of ophthalmic lenses at maximum (with ophthalmic lenses of different lots being different in at least one parameter, e.g. front curve or base curve geometry, diopters, toric parameters, rotational stabilization features, etc.). Of course, concurrently producing a lower number of different lots is also possible. Production is highly effective since the cycle time of each cycle may be as low as two to five seconds, for example two, three, four, or five seconds, or any other cycle time between two and five seconds.

The capping station of the production line according to the invention is configured to only place base curve plastic lens molds having the same age as the front curve plastic lens molds onto the front curve plastic lens molds containing the lens-forming material. The term 'having the same age' in this regard means that after being produced by the first and second injection-molding machines, the base curve plastic lens molds and the front curve plastic lens molds removed from the first and second injection-molding machines are exposed to the same environmental conditions (temperature, humidity, etc.) for the same period of time until the base curve plastic lens molds are placed on the front curve plastic lens molds in the capping station. In particular, the temperature of the front curve plastic lens molds and of the base curve plastic lens molds placed thereon is the same and is sufficiently low to reliably avoid an unwanted thermally initiated start of the curing process of the lens-forming material contained in the front curve plastic lens molds. The term 'the same age' therefore mandatorily includes that both the period of time during which the front curve plastic lens molds removed from the first injection-molding machine are exposed to the predetermined environmental conditions and the period of time during which the base curve plastic lens molds removed from the second injection-molding machines are exposed to the same predetermined environmental conditions, are in any event long enough to allow the front curve plastic lens molds and base curve plastic lens molds to cool down to a temperature at which an unwanted thermally initiated start of the curing process of the lens-forming material is reliably avoided. This period of time may depend on the lens-forming material used (so that it may be at least some minutes or more, for example five minutes or more), and may further depend on the plastic material used for injection-molding of the front curve and base curve plastic lens molds. Ideally, the period of time during which the front curve plastic lens molds removed from the first injection-molding machine are exposed to the predetermined environmental conditions is exactly the same as the time period during which the base curve plastic lens molds removed from the second injection-molding machine and their exposure to the same predetermined environmental conditions. However, the set-up of the production line can also be chosen such that the period of time during which the front curve plastic lens molds removed from the first injection-molding machine are exposed to the predetermined environmental conditions and the period of time during which the base curve plastic lens molds removed from the second injection-molding machine are exposed to the same predetermined environmental conditions are different by up to thirty-five seconds during normal operation. In particular, the difference may be an integer multiple of the cycle time. Even in case there is a short malfunction of the production line for a period of time which may be up to three minutes or a few seconds more, so that the difference of the period of time the front curve plastic molds removed from the first injection-molding machine are exposed to the predetermined environmental conditions and the period of time the base curve plastic lens molds removed from the second injection-molding machine are exposed to the same predetermined environmental conditions is different by this period of time, this is still tolerable and is covered by the term 'the same age'. However, in any event the mandatory condition still applicable is that, regardless of the magnitude of the difference in the period of time, the temperature of both the front curve plastic lens molds and the base curve plastic lens molds must be sufficiently low to reliably avoid an unwanted thermally initiated start of curing of the lens-forming material that may be caused by too high a temperature of the front curve plastic lens molds or the base curve plastic lens molds. Ideally, however, the set-up of the production line is such that this period of time is exactly the same for the front curve plastic lens molds and the base curve plastic lens molds.

This is possible since the injection-molding machines are arranged in the production line itself (they form components of the production line) so that the concept of the production line allows the base curve plastic lens molds and the front curve plastic lens molds to be exposed to the same environmental conditions for the same period of time prior to being mated in the capping station. Since all base curve plastic lens molds placed on all front curve plastic lens molds in the capping station always have the same age, deviations of the geometry of the plastic lens molds caused by different temperatures of the plastic lens molds are avoided and a constant high quality of the ophthalmic lenses produced with the aid of such plastic lens molds is obtained. This may be achieved, for example, with the aid of a front curve plastic mold buffer module and a base curve plastic mold buffer module arranged between the first injection-molding machine and the casting module and the second injection-molding machine and the casting module, respectively, with the environmental conditions (temperature, humidity, etc.) being the same in the front curve and base curve plastic mold buffer modules and in the casting module.

The closed plastic lens molds (containing lens-forming material) obtained by placing the base curve plastic lens molds on the front curve plastic lens molds in the casting module are then transferred (e.g. by a transfer robot) to a stacking module where the closed plastic lens molds are placed on a lens mold tray, with a plurality of such lens mold trays loaded with closed plastic lens molds then being stacked one above the other (e.g. by a stacking robot or other stacking mechanism) to form a stack of lens mold trays.

A such stack of lens mold trays is then placed into a heatable chamber of an oven (e.g. with the aid of a stack handling robot), this heatable chamber being sized to accommodate such a stack of lens mold trays. The oven also comprises a door that can be opened and closed to allow the stack of lens mold trays loaded with plastic lens molds containing the lens-forming material to be placed into the heatable chamber and to subsequently heat the heatable chamber to a predetermined temperature to effect curing of the lens-forming material contained in the plastic lens molds to form cured lenses. The heatable chamber of the oven may be heated to different temperature levels for predetermined periods of time, or may be heated to one temperature level only for a predetermined period of time. The one temperature level or the different temperature levels may depend on the type of lens-forming material used. Also, the predetermined period of time or the predetermined periods of time at the different temperature levels may depend on the lens-forming material actually used.

Once the stack of lens mold trays has been accommodated in the heatable chamber, the heatable chamber of the oven may be purged with an inert gas until a predetermined residual low level of oxygen in the heatable chamber has been reached. Oxygen is unwanted in the heatable chamber as it may inhibit the polymerization and/or crosslinking reaction of the lens-forming material contained in the closed plastic lens molds. The respective residual low level of oxygen allowed may depend on the lens-forming material used and may be different for different lens-forming materials. After the lens-forming material has been cured at the one or more temperature levels for the one or more predetermined periods of time, the door of the oven is opened again and the stack of lens mold trays loaded with the closed plastic lens molds now containing cured lenses is removed from the heatable chamber. The stacking of the lens mold trays and the curing of a stack of lens mold trays is advantageous as it renders the production line and method of the invention efficient, since large numbers of ophthalmic lenses can be concurrently formed in the oven.

Once the lens-forming material has been cured at the one or more temperature levels for the one or more predetermined periods of time, the stack of lens mold trays loaded with closed plastic lens molds now containing cured lenses may be allowed to cool down for another predetermined period of time in the heatable chamber before the door of the oven is opened and the stack is removed. During the cooling-down period, it is no longer necessary to maintain the residual low level of oxygen in the heatable chamber anymore since cured lenses (rather than lens-forming material) are now contained in the closed plastic lens molds.

Providing a plurality of such ovens is advantageous as the thermal curing process (including the subsequent cooling-down) may take several hours, for example, so that during curing of the lens-forming material contained in the plastic lens molds on the trays of one stack in the heatable chamber of one of the plurality of ovens, subsequently formed other stacks of lens mold trays containing lens-forming material can be placed into the heatable chamber of other ones of the plurality of ovens. This allows for a continuous operation of the production line.

After the cooling-down period, the stack of lens mold trays is removed from the heatable chamber of the oven (by opening the door of the oven) and is transferred to a destacking module. In the destacking module, the individual lens mold trays are destacked (e.g. by a destacking robot or other suitable destacking mechanism) for allowing access to the closed plastic lens molds of each individual lens mold tray, each such closed plastic lens mold containing a cured lens.

After destacking, the plastic lens molds are transferred (e.g. by a transfer robot) to a demolding and delensing module. The demolding and delensing module comprises a demolding station in which the base curve plastic lens mold and the front curve plastic lens mold of a closed lens mold are demolded. After demolding, the cured lens may adhere either to the base curve plastic lens mold or the front curve plastic lens mold, from which the lens is then released in a delensing station of the demolding and delensing module. The released cured lens is then transferred from the delensing station to a treatment carrier tray (e.g. by means of a suitable transfer gripper).

The demolding and delensing module may comprise one or both of a base curve demolding and delensing branch and a front curve demolding and delensing branch. Depending on the geometrical shape and other features of the base curve plastic lens mold and the front curve plastic lens mold, and further depending on the lens-forming material used, the cured lens may tend to adhere either to the base curve plastic lens mold or to the front curve plastic lens mold. As different plastic lens molds and different lens-forming materials may be used in the production line according to the invention, both the base curve demolding and delensing branch as well as the front curve demolding and delensing branch may be provided in the production line. Alternatively, only one of them may be provided.

An important advantage of the production line according to the invention is the capability to quickly perform lot changes, despite the plastic lens molds being produced in the production line itself. This may be achieved by a particular construction of the first and second tool halves of the first injection-molding machine (for producing the front curve plastic lens molds) and of the third and second tool halves of the second injection molding machine (for producing the base curve plastic lens molds).

As regards the first injection-molding machine, this particular construction comprises a first tooling plate to which individual first sleeves are pre-mounted. Each of the individual first sleeves has an individual optical tool insert mounted thereto, and this optical tool insert determines the shape of the concave optical front surface of the front curve plastic lens mold formed by the optical tool insert. The first tool half further comprises a first slot accommodating the first tooling plate and allowing to mount the first tooling plate by sliding the first tooling plate into the first slot and then fixing the first tooling plate. Demounting of the first tooling plate is possible by unfixing the first tooling plate and then pulling the first tooling plate out of the first slot.

Similarly, this particular construction comprises a second tooling plate to which individual second sleeves are pre-mounted. Each of the second sleeves has an individual back piece insert mounted thereto, and this back piece insert determines the shape of the convex back surface of the front curve plastic lens mold formed by the back piece insert. The second tool half further comprises a second slot accommodating the second tooling plate and allowing to mount the second tooling plate by sliding the second tooling plate into the second slot and then fixing the second tooling plate. Demounting of the second tooling plate is possible by unfixing the second tooling plate and then pulling the second tooling plate out of the second slot.

The first and second tooling plates with the first and second pre-mounted sleeves and the optical tool inserts and the back piece inserts mounted thereto can be set up at a location remote from the production line, so that at the time a lot change is to be performed, the production line must be stopped. Then, the first and second tooling plates mounted to the first and second tool halves of the first injection-molding machine can be unfixed and pulled out of the first and second slots of the first and second tool halves, respectively. Thereafter, the new first and second tooling plates which have been set up remote from the production line (and which are thus ready for use) can be mounted to the first and second tool halves, respectively, by sliding the new first and second tooling plates into the first and second slots of the first and second tool halves and then fixing them. Thus, the time needed to perform a lot change is very short, as the mounting and unmounting of the tooling plates can be quickly and easily performed.

As regards the second injection-molding machine, this particular construction comprises a third tooling plate to which individual third sleeves are pre-mounted. Each of the third sleeves has an individual optical tool insert mounted thereto, and this optical tool insert determines the shape of the convex optical front surface of the base curve plastic lens mold formed by the optical tool insert. The third tool half further comprises a third slot accommodating the third tooling plate and allowing to mount the third tooling plate by sliding the third tooling plate into the third slot and then fixing the third tooling plate. Demounting of the third tooling plate is possible by unfixing the third tooling plate and then pulling the third tooling plate out of the first slot.

Similarly, this particular construction comprises a fourth tooling plate to which individual fourth sleeves are pre-mounted. Each of the fourth sleeves has an individual back piece insert mounted thereto, and this back piece insert determines the shape of the concave back surface of the base curve plastic lens mold formed by the back piece insert. The fourth tool half further comprises a fourth slot accommodating the fourth tooling plate and allowing to mount the fourth tooling plate by sliding the fourth tooling plate into the fourth slot and then fixing the fourth tooling plate. Demounting of the fourth tooling plate is possible by unfixing the fourth tooling plate and then pulling the fourth tooling plate out of the fourth slot.

Also here, the third and fourth tooling plates with the third and fourth pre-mounted sleeves and the optical tool inserts and the back piece inserts mounted thereto can be set up at a location remote from the production line, so that at the time a lot change is to be performed, the production line must be stopped. Then, the third and fourth tooling plates mounted to the third and fourth tool halves of the second injection-molding machine can be unfixed and pulled out of the third and fourth slots of the third and fourth tool halves, respectively. Thereafter, the new third and fourth tooling plates which have been set up remote from the production line (and which are thus ready for use) can be mounted to the third and fourth tool halves, respectively, by sliding the new third and fourth tooling plates into the third and fourth slots of the third and fourth tool halves and then fixing them. Thus, the time needed to perform a lot change is very short, as the mounting and unmounting of the tooling plates can be quickly and easily performed.

Overall, pulling a tooling plate out of a slot of a tool half and thereafter inserting another pre-set tooling plate into the slot of the said tool half is a simple constructional option that allows for a quick lot change. The tooling plates can be properly set-up at a location remote from the production line, so that only the tooling plate to be replaced can be unfixed and pulled out of the slot, and then the new tooling plate can be inserted into the slot and fixed. Thereafter, production can be resumed.

This holds even more in case one tool half (i.e. the first tool half of the first injection-molding machine and the fourth tool half of the second injection-molding machine) comprises a fixed block having the slot accommodating the tooling plate to which the sleeves are pre-mounted, and a corresponding alignment plate which is releasably mounted to the fixed block. The alignment plate comprises through-openings accommodating the sleeves with the optical tool inserts or back piece inserts, respectively. Accordingly, when the alignment plate is mounted to the respective fixed block, the sleeves (with the optical tool inserts or back piece inserts mounted thereto) are individually aligned by the respective through-holes provided in the alignment plate. In addition, since this tool half does not comprise the hot runner pipes for injecting the hot flowable thermoplastic material, the temperature of the components of this tool half (first or fourth) is not critical, so that it is easily possible to change the tooling plate and thus perform the lot change.

With respect to the other tool half (second tool half of the first injection-molding machine and third tool half of the second injection-molding machine) this is a little bit different, as this mold half also comprises the hot runner pipes through which the hot flowable thermoplastic material is injected. These hot runner pipes must be maintained at a high temperature, since in case they would have to be cooled down to a temperature at which the tooling plate change may be performed, this would take an extended period of time which would render a lot change inefficient.

Therefore, the construction of the other tool half (second and third) comprises a fixed block accommodating therein the hot runner pipes which extend out of this fixed block towards the tool half (first or fourth) not having the hot runner pipes arranged therein. A mounting plate is releasably mounted to the fixed block, and this mounting plate comprises the slot for slidingly inserting the tooling plate and for pulling the tooling plate out. The mounting plate, the tooling plate and the sleeves mounted thereto comprise hot runner through-holes accommodating therein the hot runner pipes. To perform a lot change, the mounting plate is released from the fixed block and is moved away from the fixed block, so that the hot runner pipes arranged in the fixed block do no longer extend into the through-holes of the tooling plate and the sleeves mounted thereto. The tooling plate to be replaced can then be pulled out of the slot of the mounting plate and the new pre-set tooling plate can be slidingly inserted into the slot. During this exchange of the tooling plate, the hot runner pipes can be kept at high temperature and do not have to cool down during this tooling plate change. An alignment plate is movably mounted to the mounting plate and has through-openings for accommodating the sleeves of the tooling plate. Like for the other tool half, the alignment plate individually aligns the sleeves mounted to the tooling plates. However, unlike the alignment plate of the other tool half (first or fourth), the alignment plate of this tool half (second or third) is movably mounted to the mounting plate. In particular, the alignment plate is biased a short distance away from the mounting plate, so that upon moving the tool halves of the respective (first or second) injection-molding machine away from each other the alignment plate is moved away from the mounting plate by a predetermined short distance. This helps to make sure that the plastic lens molds adhere to that tool half not having the alignment plate movably mounted thereto, since upon moving the tool halves of the respective (first or second) injection-molding machine away from each other, the movably mounted alignment plate strips the plastic lens mold off of this tool half and thus makes the plastic lens mold adhere to the other tool half (first or fourth).

Arranging front curve plastic lens mold and base plastic lens mold buffers between the first and second injection-molding machine and the casting module, and having the same environmental conditions (temperature, humidity, etc.) in these buffers as in the casting module helps making sure that the base curve plastic lens molds placed on the front curve plastic lens molds in the casting module have been exposed to the same environmental conditions for the same period of time, so that the front curve plastic lens molds containing the lens-forming material and the base curve plastic lens molds placed thereon always 'have the same age' (i.e. have been exposed to the same environmental conditions for the same period of time after being removed from the respective injection-molding machine).

The casting module may comprise a toric angle verification station that comprises a camera. In case the front curve plastic lens molds and the base curve plastic lens molds used for producing toric ophthalmic lenses have features that allow the determination of the rotational orientation of the respective front curve plastic lens mold and the respective base curve plastic lens mold, it is possible to verify the correct rotational orientation of these molds (and thus of the 'toric' features of the ophthalmic lens produced therewith).

The use of stacks of treatment carrier trays in the treatment module also renders the production line more efficient, as large numbers of ophthalmic lenses can be treated in the liquid baths simultaneously. In case a plurality of baths of each type are provided in the treatment module, it is possible to concurrently process more than one stack in the treatment module, so that a continuous operation of the production line is possible without any time gaps in which no lenses are produced. Also, it is possible to produce ophthalmic lenses from different lens-forming materials. And although this may require different curing times, curing temperatures, allowed levels of residual oxygen in the ovens, and although it may require different types of liquids in the treatment baths of the treatment module, the general concept of the production line remains the same. By way of example, some lens-forming materials may require organic extraction liquids for the extraction while other lens-forming material may only require extraction in water. Further by way of example, some lens-forming materials may require a coating to be applied to the lens, while other lens-forming materials may not require such coating or even prohibit the application of a coating to the lens.

In any event, for the subsequent inspection of the ophthalmic lenses carried by the individual treatment carrier trays, at the end of the treatment module the individual treatment carrier trays of a stack need to be unstacked to allow access to the individual ophthalmic lenses carried by each individual treatment carrier tray.

Another advantageous aspect of the production line according to the invention is that the geometrical shape of the closed-loop rail of the inspection module on which the self-driving shuttles are arranged, can be freely determined (chosen). Accordingly, the geometrical shape of the closed-loop rail can be fit to the available space in the room or hall where the production line is to be arranged. The various stations of the inspection module are arranged along this closed-loop rail, regardless of its geometrical shape. This provides for additional flexibility of the production line. Also, the self-driving shuttles arranged on the closed-loop rail carrying the inspection cuvettes in which the ophthalmic lenses are inspected help create a kind of a 'buffer' in the production line. For example, in case of a short period of malfunction or interruption (of some seconds, for example) of the treatment module ophthalmic lenses may not be transferred to the inspection cuvettes on the self-driving shuttle waiting at the lens insertion station of the inspection module. However, this does not lead to an interruption of the inspection module. Instead, the self-driving shuttle waiting at the lens insertion station of the inspection module may then wait until this short period of malfunction or interruption is over and ophthalmic lenses are transferred to the cuvettes arranged on this self-driving shuttle again. The other self-driving shuttles arranged on the closed-loop rail may continue to move along the closed-loop rail during this period of time. As a result, the distance between the self-driving shuttle waiting at the lens insertion station and the shuttle ahead temporarily increases. In case the self-driving shuttle behind that self-driving shuttle waiting at the lens insertion station approaches the lens insertion station, the sensors of this approaching self-driving shuttle would brake the shuttle or even stop the shuttle so that no collision may occur. Once ophthalmic lenses are transferred again to the cuvettes of the shuttle waiting at the lens-insertion station, the shuttle leaving the lens insertion station may start catching up on the shuttle ahead by increasing its travelling speed, whereas the shuttle ahead may be caused to slow down by another shuttle ahead, so that the distance between the shuttles may be equalized again.

Stations arranged along the closed-loop rail comprise a cuvette filling station in which the cuvettes are arranged in a handling position and in which the cuvettes are filled with water, a lens insertion station in which the ophthalmic lenses transferred from the treatment module are inserted into the cuvettes, a first cuvette tilting station in which the cuvettes are tilted from the handling position to an inspection position, a lens inspection station in which the ophthalmic lenses in the cuvettes are inspected, a first cuvette tilting-back station in which the cuvettes are titled back to the handling position, an ophthalmic lens transfer station in which those ophthalmic lenses that have successfully passed the inspection are transferred to the primary packaging module, and a cuvette cleaning station for sucking the water from the cuvettes.

Optionally, between the lens insertion station and the first tilting station, an initial cuvette tilting station may be arranged in which the cuvettes containing the ophthalmic lenses inserted in the lens insertion station are tilted to the inspection position, an inversion detection station in which it is detected whether or not an ophthalmic lens contained in the cuvette is inverted, an initial tilting-back station in which the cuvettes are tilted back to the handling position, and a re-inverting station in which lenses that are inverted are re-inverted.

According to this application, a contact lens manufacturing line allows for a very quick change of the production parameters. This is achieved through a concept of pre-configured tooling plates for an injection molding machine (which is an integral part of the production line) allowing for a quick exchange of the tooling plates used in the injection molding machine without the need to decrease the temperature of the injection molding machine. Also, the design of the manufacturing line allows to concurrently handle a plurality of different production orders in the same manufacturing line, and each production order may contain up to 16 different products. Also, a change between different contact lens materials is possible through some mechanical and/or software-related adaptations. The automation concept of the manufacturing line allows for the exact tracing of the contact lenses in each manufacturing step.

BRIEF DESCRIPTION OF THE DRAWINGS

Further advantageous aspects of the invention become apparent from the following description of an embodiment of the invention with the aid of the drawings in which:

FIG. 3 shows two tool halves of an injection-molding machine of the front end of the production line according to the invention (closed position);

FIG. 4 shows the two tool halves of FIG. 3 in an open position, and a gripper tool arranged between them for removing the injection-molded plastic lens molds;

FIG. 5 shows an embodiment of a buffer tray used in the base curve plastic lens mold buffer module or in the front curve plastic lens mold buffer module;

FIG. 6 shows a mover for transportation of the front curve and base curve plastic lens molds through a casting module, the mover first loaded with front curve plastic lens molds only, then with front curve plastic lens molds and base curve plastic lens molds, and finally at a filling station where lens-forming material is dosed into the front curve plastic lens molds;

FIG. 14 shows the handling robot placing the stack of carrier trays carrying the cured lenses into a first treatment bath and then leaving the stack in the first treatment bath;

FIG. 15 shows the handling robot removing the stack of carrier trays carrying the cured lenses from the first treatment bath;

FIG. 16 shows the handling robot tilting the stack of carrier trays such that treatment liquid is allowed to flow back into the first treatment bath;

FIG. 17 shows the stack either being placed into a second treatment bath or to be moved to a lens transfer station for destacking of the carrier trays and transfer of the ophthalmic lenses to an inspection module;

FIG. 18 shows a self-driving shuttle of the inspection module with a plurality of inspection cuvettes being arranged on the shuttle in the handling position;

FIG. 19 shows the self-driving shuttle of FIG. 18 with the inspection cuvettes being arranged on the shuttle in the inspection position;

FIG. 20 shows an embodiment of the lens inspection module with various stations arranged along a closed-loop rail;

FIG. 21 shows the footprint of the closed-loop rail illustrating the geometrical shape of the closed-loop rail and the stations arranged along the closed-loop rail;

FIG. 27 shows a top view of the first and second tool halves shown in FIG. 25 and FIG. 26 (tool halves in open position);

FIG. 28 shows a sectional view of the first and second tool halves along line XXVIII-XXVIII of FIG. 27;

FIG. 29 shows a sectional view of the first and second tool halves along line XXIX-XXIX of FIG. 27;

FIG. 30 shows a top view of the first and second tool halves shown in FIG. 23 and FIG. 24 (tool halves in closed position);

FIG. 31 shows a sectional view of the first and second tool halves along line XXXI-XXXI FIG. 30; and FIG. 32 shows a sectional view of the first and second tool halves along line XXXII-XXXII of FIG. 30.

Generally, the automated production line according to the invention comprises a front end and a back end, each of which comprises a plurality of individual modules and stations which will be explained in the following with the aid of embodiments.

Figure 1:
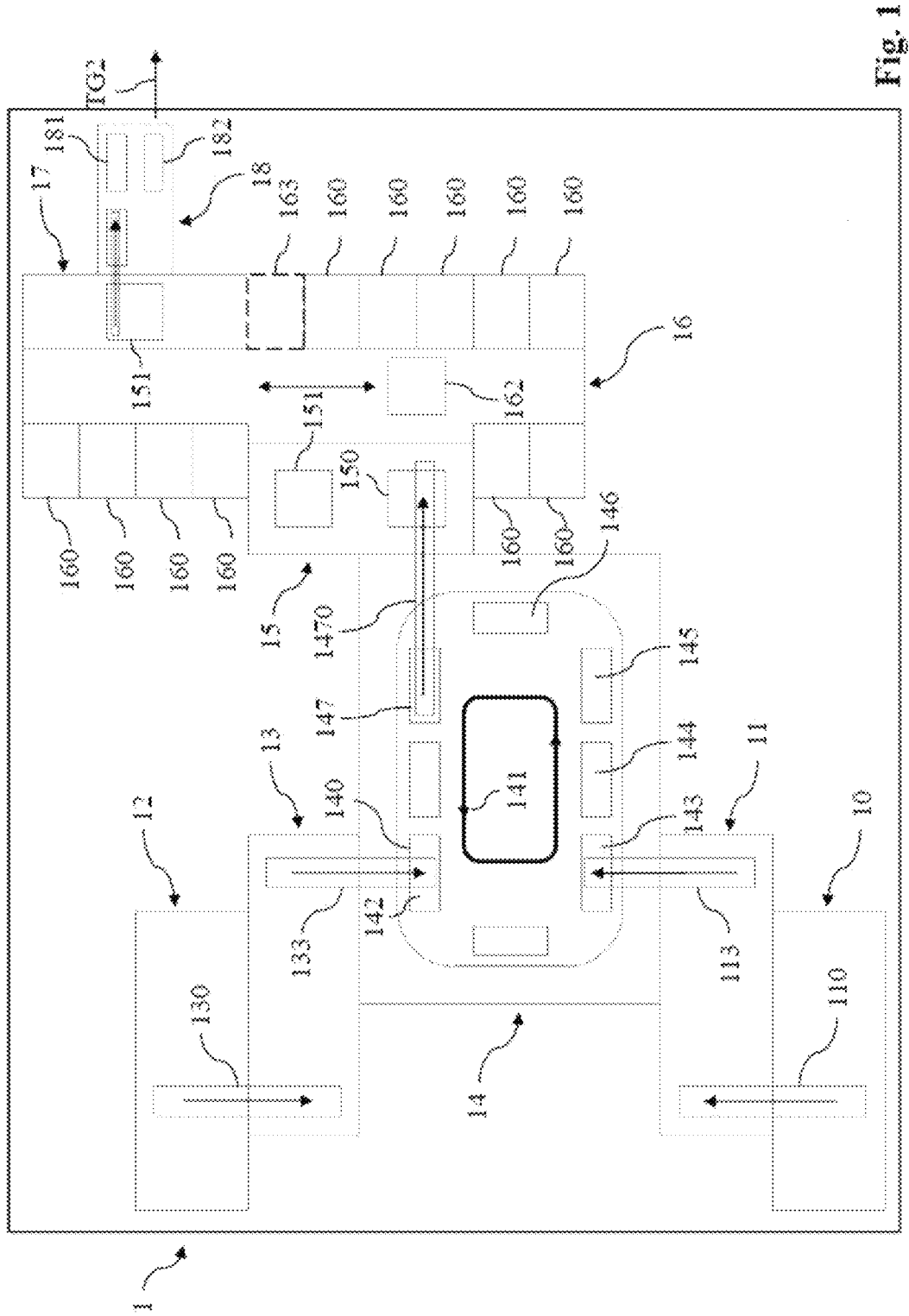
FIG. 1 shows an embodiment of a front end of the production line according to the invention.

FIG. 1 shows an embodiment of a front end 1 of the automated production line for the production of ophthalmic lenses, in particular contact lenses such as soft contact lenses, for example silicone hydrogel contact lenses, in accordance with the invention. The individual modules and components of the front end 1 will be discussed in more detail in the following. While FIG. 1 shows the general arrangement of the individual modules and components, the modules and components will be described also with the aid of FIG. 2-FIG. 12. Front end 1 comprises a first injection-molding machine 10 arranged in the production line (it is a component of the production line). This first injection-molding machine 10 is configured to concurrently produce a plurality of front curve plastic lens molds within a predetermined cycle time. The predetermined number of front curve plastic lens molds produced within one (clock) cycle may for example be eight, ten, twelve, sixteen, twenty, or may be any other number. Generally, the predetermined cycle time is less than ten seconds, in particular less than five seconds, and is preferably two to five seconds. By way of example the predetermined cycle time may be two, three, four or five seconds, and in particular about four seconds.

Front end 1 further comprises a front curve plastic lens mold buffer module 11 for intermediate storage and cooling of the front curve plastic lens molds at predetermined environmental conditions (predetermined temperature, for example 22° C.; predetermined relative humidity, for example 60%) for a predetermined cooling time period. The front curve plastic lens molds removed from the first injection-molding machine 10 are transferred to the front curve plastic lens mold buffer module 11 with the aid of a front curve plastic lens mold handling mechanism 110.

Front end 1 further comprises a second-injection molding machine 12 arranged in the production line (it is also a component of the production line). This second injection-molding machine 12 is configured to concurrently produce a plurality of base curve plastic lens molds within a predetermined cycle time. The predetermined number of base curve plastic lens molds produced by the second injection-molding machine 12 within one (clock) cycle may for example be eight, ten, twelve, sixteen, twenty, or may be any other number, and corresponds to the number of front curve plastic lens molds produced by the first injection-molding machine 10 within one (clock) cycle. Also here, generally the predetermined cycle time may range from three seconds to ten seconds. More preferably, the predetermined cycle time is less than five seconds, and by way of example the predetermined cycle time may be about four seconds. In any event, the cycle time of the second injection molding-machine 12 corresponds to the cycle time of the first injection molding machine 10.

Front end 1 further comprises a base curve plastic lens mold buffer module 13 for intermediate storage and cooling of the base curve plastic lens molds at predetermined environmental conditions (predetermined temperature, for example 22° C.; predetermined relative humidity, for example 60%) for a predetermined cooling time period. The base curve plastic lens molds removed from the second injection-molding machine 12 are transferred to the base curve plastic lens mold buffer module 13 with the aid of a base curve plastic lens mold handling mechanism 130.

The cooling time period of the front curve plastic lens molds in the front curve plastic lens mold buffer module 11 and the cooling time period of the base curve plastic lens molds in the base curve plastic lens mold buffer module 13 are predetermined (as are the environmental conditions in the two buffer modules 11 and 13). These cooling time periods are selected such that the temperature of the front curve plastic lens molds and the base curve plastic lens molds is lower than a predetermined temperature, so that no inadvertent curing of the lens-forming material caused by the temperature of the front curve plastic lens molds or the temperature of the base curve plastic lens molds may occur, for example at the time the lens-forming material is dosed into the front curve plastic lens mold or after the closed plastic lens molds containing the lens-forming material have been formed by placing the base curve plastic lens molds onto the front curve plastic lens molds. Depending on the lens-forming material used, this predetermined temperature may be lower than 30° C., for example.

This process of injection-molding either the front curve plastic lens molds in the first injection molding machine 10 or the base curve plastic lens molds in the second injection-molding machine 12 is further illustrated in FIG. 3 and FIG. 4. In FIG. 3, the first tool half 101 and the second tool half 102 of the first injection-molding machine 10 are shown in the closed position. As this applies similarly to the third tool half 121 and the fourth tool half 122 of the second injection-molding machine 12, the references signs of both injection-molding machines are used in FIG. 3 and FIG. 4. The double-headed arrow shown in FIG. 3 indicates that after the front curve plastic lens molds are molded through injection of a flowable thermoplastic material and curing of the said thermoplastic material to form the front curve plastic lens molds, the first tool half 101 and the second tool half 102 are moved away from each other to an open position shown in FIG. 4, and a gripper tool 100 comprising suction cups 1000 is introduced between in the space formed between the first tool half 101 and the second tool half 102. The gripper tool 100 serves for removal of the front curve plastic lens molds from the first tool half 101 through the application of suction, and after removal of the front curve plastic lens molds from the first tool half 101 the gripper tool 100 is removed from the space formed between the first tool half 101 and the second tool half 102. Thereafter, the first tool half 101 and the second tool half 102 are moved towards each other to the closed position shown in FIG. 3, and the next cycle is performed in which the next front curve plastic lens mold is formed through injection of the flowable thermoplastic material. It is noteworthy that the entire (clock) cycle may only take the afore-mentioned two, three, four or five seconds, in particular about four seconds, and within these about four seconds all afore-mentioned steps are performed, i.e. the injection of the flowable thermoplastic material (first tool half 101 and second tool half 102 in the closed position), the subsequent curing of the thermoplastic material to form the front curve plastic lens mold, the opening of the first tool half 101 and the second tool half 102, the removal of the molded front curve plastic molds by introducing the gripper tool 100 in the space formed between the first tool half 101 and the second tool half 102 (first tool half 101 and second tool half 102 in the open position), sucking the front curve plastic lens molds from the first tool half 101 and then removing the gripper tool 100 from the said space, as well as the subsequent closing of the first tool half 101 and the second tool half 102. This holds similarly for the third tool half 121 and the fourth tool half 122 of the second injection-molding machine and the gripper tool 120 with the suction cups 1200 of the second injection-molding machine 12, so that the respective reference signs have been used in FIG. 3 and FIG. 4, too.

Once the front curve plastic lens molds and the base curve plastic lens molds are removed from the respective injection-molding machine, they are transferred by the front curve plastic lens mold handling mechanism 110 and the base curve plastic lens mold handling mechanism 130 to the front curve plastic lens mold buffer 11 and the base curve plastic lens mold buffer 13, respectively, where they are placed on intermediate storage trays 111, 131 at predetermined locations 112, 132 and stored for the predetermined cooling time period at the afore-mentioned predetermined environmental conditions. This can be seen best in FIG. 5 in which eight such predetermined locations 112, 132 are arranged in a row.

Turning back to FIG. 1, after the cooling time period in the base curve plastic lens mold buffer 13 is over, the front curve plastic lens molds arranged in a row of the intermediate storage tray 111, 131 are transferred to a mover 140 (a specific carrier) of a casting module 14. The environmental conditions in the casting module 14 are identical with the environmental conditions in the front curve plastic lens mold buffer 11 and in the base curve plastic lens mold buffer 13. Transfer of the base curve plastic lens molds from the base curve plastic lens mold buffer 13 to the casting module 14 is performed with another base curve plastic lens mold handling mechanism 133, and transfer of the front curve plastic lens molds from the front curve plastic lens mold buffer 11 to the casting module 14 is performed with another front curve plastic lens mold handling 113.

The movers 140 are cyclically circulated in the casting module 14 along a closed loop track as is indicated by the arrow 141. During each clock cycle the respective mover 140 is moved to the next station of the casting module 14. At a base curve lens mold placement station 142, eight base curve plastic lens molds are concurrently placed onto the mover 140 at predetermined locations 1400. This can be seen in FIG. 6 (uppermost step shown). At the time this mover 140 reaches the front curve placement station 143, eight front curve plastic lens molds are concurrently placed onto this mover 140 at locations 1401 (step shown in the middle; note that the changed positions 1400 on the mover 140 are a result of the reversal of the direction of movement of the mover 140). In the subsequent filling station 144, a predetermined amount of a flowable lens-forming material is dosed into the (concave) front curve plastic molds with the aid of a dosing mechanism 1440 comprising a plurality of dosing tips 1441 (lowermost step shown).

The mover 140 is then moved to the capping station 145 during the next clock cycle. The capping station 145 is special in the embodiment described. This has to do with the fact, that due to the different manner the front curve base curve plastic lens molds and the base curve plastic lens molds are transferred onto the intermediate storage trays 111, 131 of the front curve plastic lens mold buffer 11 and of the base curve plastic lens mold buffer 13, the base curve plastic lens molds on a mover 140 are one (clock) cycle 'younger' than the front curve plastic lens molds on the same mover 140 (i.e. the cooling time period of the base curve plastic lens molds is one clock cycle shorter than the cooling time period of the front curve plastic lens molds). The base curve plastic lens molds to be placed onto the front curve plastic lens molds containing the lens-forming material need to have the same 'age' (i.e. they need to be exposed to the same environmental conditions for the same period of time) so that deviations in the geometry (shape) of the front curve and base curve plastic lens molds caused by different temperatures of the front curve and base curve plastic lens molds are avoided which may otherwise result in deviations of the geometry of the ophthalmic lenses. For that reason, the base curve plastic lens molds which are placed on the front curve plastic lens molds must have been exposed to the same environmental conditions for the same period of time, and this holds for all base curve plastic lens molds placed on all front curve plastic lens molds in the production line, as this leads to a constant high quality of the ophthalmic lenses produced in the production line.

Turning back to the embodiment of the front end 1 of the production line described here, as mentioned the base curve plastic lens molds BCM are one clock cycle 'younger' than the front curve plastic lens molds FCM arranged on the same mover 140. This 'difference in age' is compensated for in the capping station 145. As can be seen best in FIG. 7, at the time the mover 140 arrives at the capping station, capping stamps 1450 carrying the base curve plastic lens molds BCM from the preceding mover 140 are already waiting at the capping station 145 for placing these base curve plastic lens mold BCM of the preceding mover 140 onto the front curve plastic lens molds FCM on the mover that has arrived at the capping station 145 and is presently arranged there (upper portion of FIG. 7, left-hand side). An intermediate storage carrier 1452 is arranged close to the base curve plastic lens molds BCM on the mover 140 presently arranged in the capping station 145. The base curve plastic lens molds BCM of the mover presently arranged in the capping station 145 are then to be picked up with the aid of grippers 1451 (upper portion of FIG. 7, right-hand side). The base curve plastic lens molds BCM (from the preceding mover 140) carried by the capping stamps 1450 are then placed onto the front curve plastic lens molds FCM arranged on the mover 140 presently arranged in the capping station 145 (these front curve plastic lens molds FCM being filled with lens-forming material) so as to form closed plastic lens molds BCM/FCM containing the lens-forming material. Since the base curve plastic lens molds BCM from the preceding mover 140 (i.e. from the preceding clock cycle) are placed on the front curve plastic lens molds of the mover 140 presently arranged in the capping station 145, the difference in age is compensated for. Those base curve plastic lens molds BCM of the mover 140 presently arranged in the capping station 145 and picked up by the grippers 1451 are placed on the intermediate storage carrier 1452, and from this intermediate storage carrier 1452 the base curve plastic lens molds BCM are then picked up by the capping stamps 1450 so that they are ready for being placed on the front curve plastic lens molds FCM arranged on the next mover arriving at the capping station 145.

In case toric ophthalmic lenses (or more generally: ophthalmic lenses which are not rotationally symmetrical) are to be produced with the rotational stabilization features being provided on the front curve plastic lens molds FCM (and thus on the anterior surface of the ophthalmic lens) and the toric surface being provided on the base curve plastic lens molds BCM (and thus on the posterior surface of the ophthalmic lens), the base curve plastic lens molds BCM need to be rotated to the desired rotational orientation. This rotation of the base curve plastic lens molds BCM to the desired rotational orientation is performed after the base curve plastic lens molds BCM are picked up from the intermediate storage carrier 1452 and before they are placed on the front curve plastic lens molds FCM of the next mover 140 by the capping stamps 1450 once the next mover 140 arrives at the capping station 145.

Figure 8:
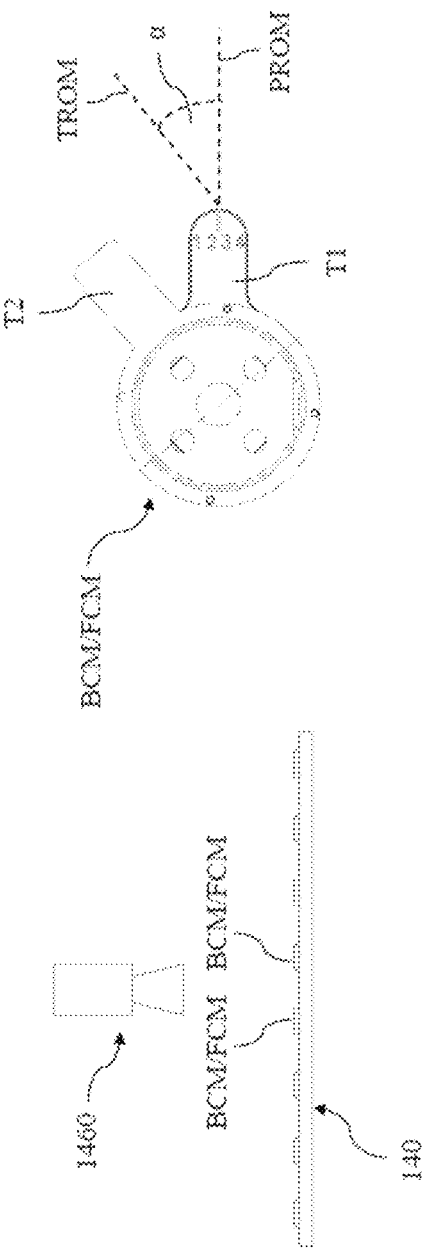
FIG. 8 shows an embodiment of a toric angle verification station of the casting module comprising a camera (left-hand side), and the verification of the toric angle (right-hand side)

The next station on the track in the casting module 14 is a toric angle verification station 146 (see FIG. 1), the details being shown in FIG. 8. This station essentially serves to verify whether the toric angle $\alpha$ is correctly set (in case of toric ophthalmic lenses), i.e. it is verified whether the base curve plastic lens molds BCM are arranged at the correct target rotational orientation TROM relative to the predetermined rotational orientation PROM of the front curve plastic lens molds FCM so that the toric angle $\alpha$ has the correct value (see illustration on the right-hand side of FIG. 8). In this embodiment each of the front curve plastic lens molds FCM has tab T1 and each of the base curve plastic lens molds BCM has a tab T2, and the angular positions of these tabs T1 and T2 are used to verify whether the toric angle $\alpha$ is correctly set. This verification of the toric angle is performed with the aid of a camera 1460 (see illustration on the left-hand side of FIG. 8) which is arranged above the respective mover 140, and with the aid of image analysis.

While the tabs T1 and T2 of the base curve plastic lens molds BCM and the front curve lens molds FCM shown in FIG. 8 are only described by way of example in order to illustrate how the toric angle verification may be performed, any other marks on the base curve plastic lens molds BCM and the front curve plastic lens molds FCM which are indicative of the rotational orientation of the respective mold and which are detectable using the camera 1460 are possible as well. In case it is detected that the base curve plastic lens molds BCM does not have the desired rotational orientation, the rotational orientation may be corrected in the toric angle verification station by suitable tools (not shown).

Figure 9:
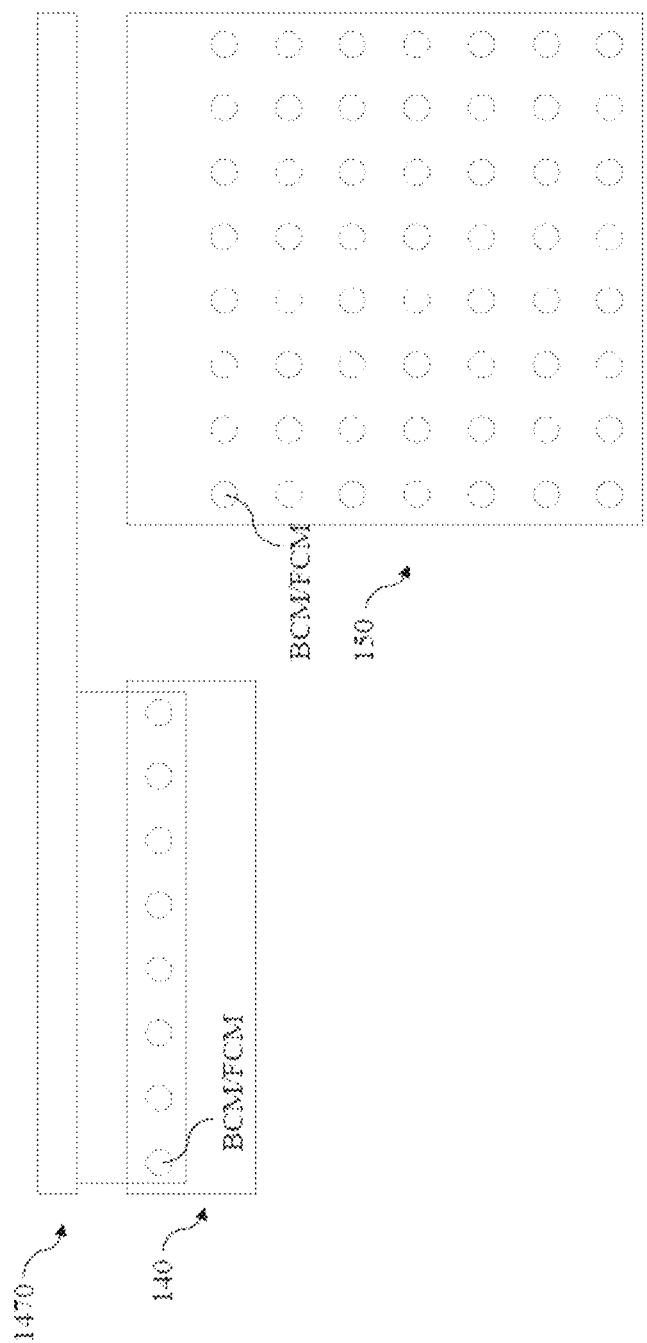
FIG. 9 shows a first transfer robot transferring the closed plastic lens molds from the casting module to an individual lens mold tray of a stacking module, in which stacks of individual lens mold trays loaded with closed plastic lens molds are formed.
Figure 10:
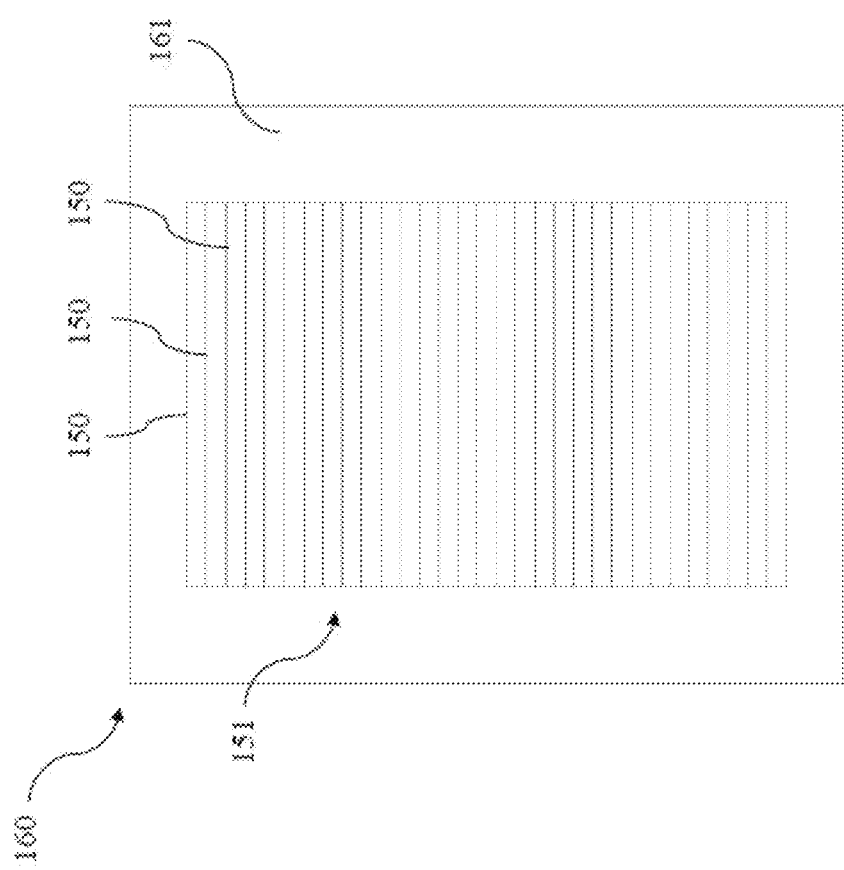
FIG. 10 shows an oven comprising a heatable chamber in which a stack of individual lens mold trays is arranged to form cured lenses from the lens-forming material contained in the closed plastic lens molds.
Figure 11:
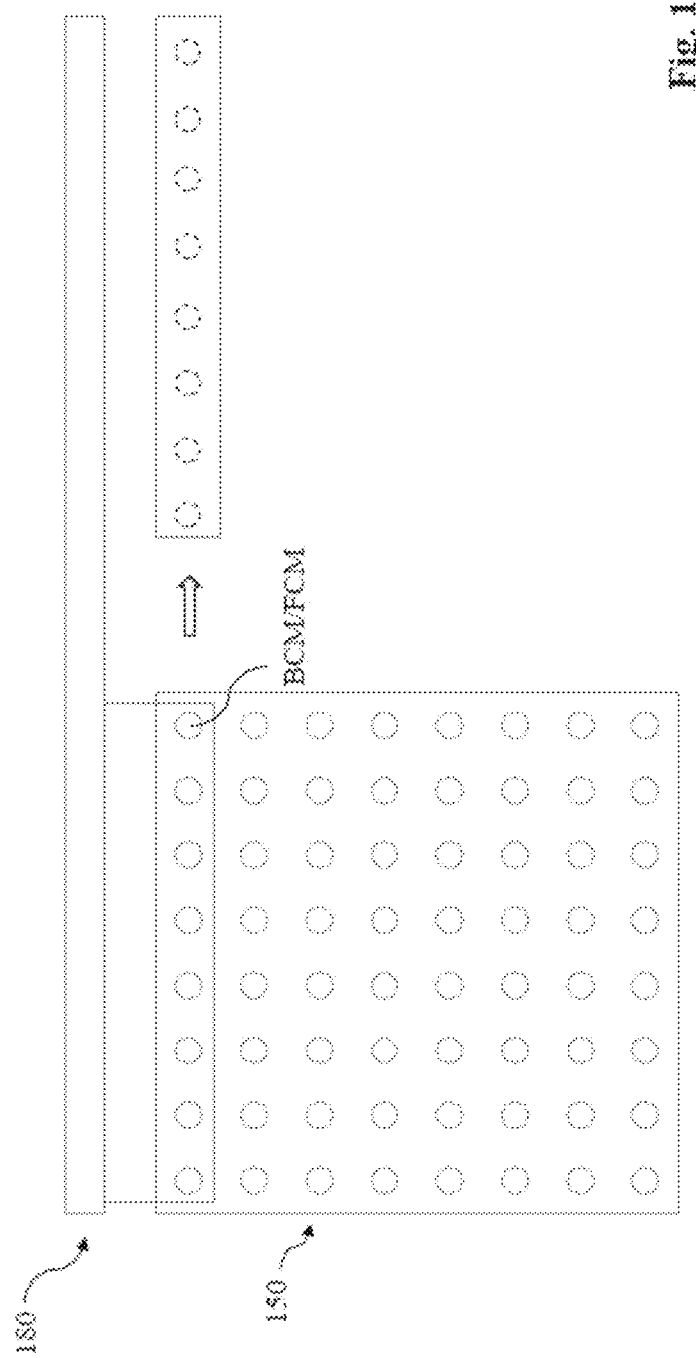
FIG. 11 shows a transfer robot for transferring closed lens molds containing cured lenses from an individual destacked lens mold tray to a demolding and delensing module.
Figure 12:
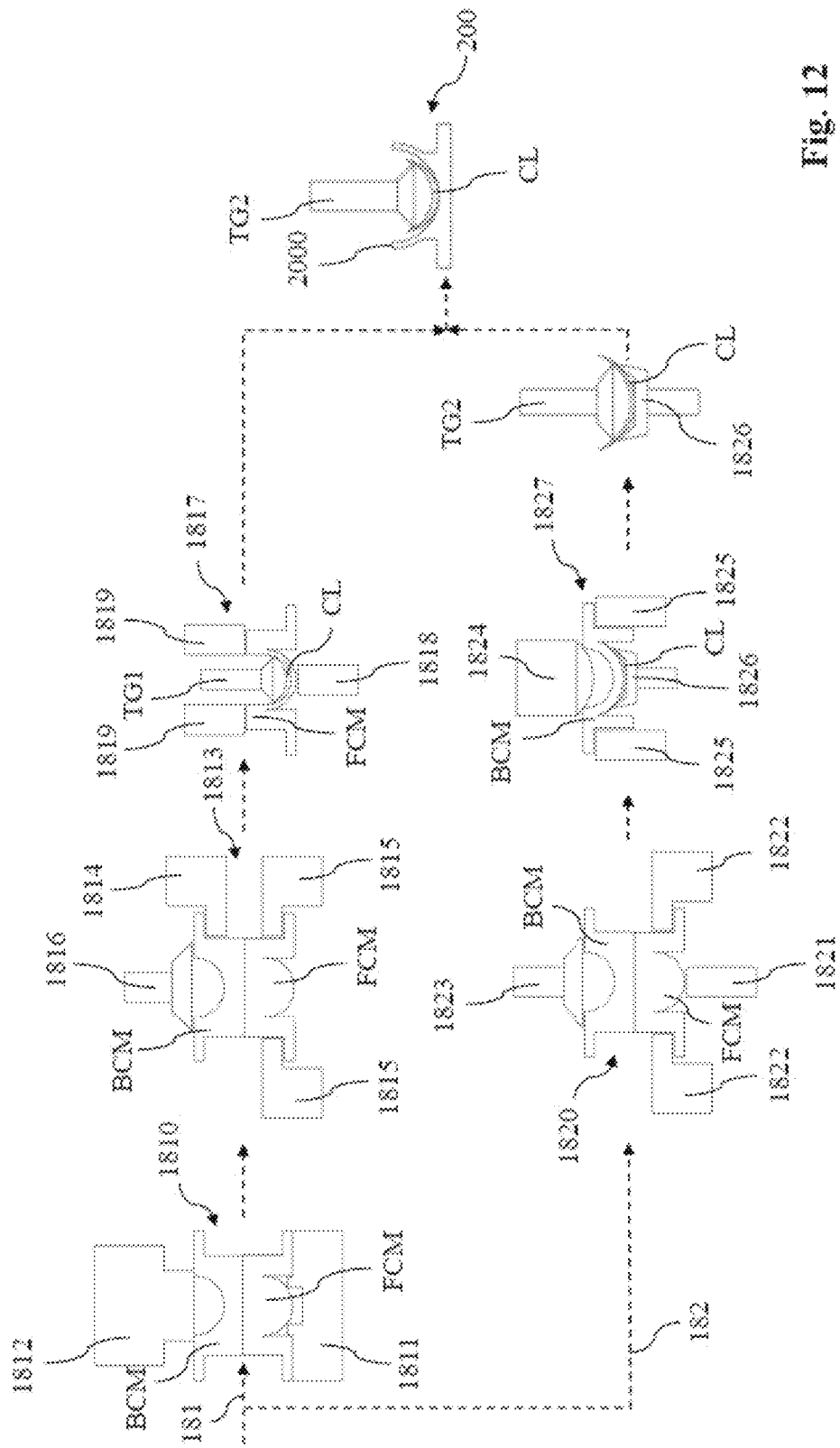
FIG. 12 shows an embodiment of the demolding and delensing module, the demolding and delensing module comprising a front curve demolding and delensing branch and/or a base curve demolding and delensing branch, with the demolded cured lenses being transferred to a treatment carrier tray.

The next station 147 on the track in the casting module 14 serves for the transfer of the closed plastic lens molds BCM/FCM containing the lens-forming material to a stacking module 15 (see FIG. 9). A first transfer robot 1470 is provided which is configured to transfer the closed plastic lens molds BCM/FCM containing the lens-forming material (in the embodiment shown eight such closed plastic lens molds) from the mover 140 to a lens mold tray 150 waiting at the stacking module 15. The respective row to which the eight closed plastic lens molds BCM/FCM are transferred is left blank in FIG. 9 to indicate the location where the closed plastic lens molds BCM/FCM are to be placed. The rest of the lens mold tray 150 shown in FIG. 5 is already loaded with closed plastic lens molds BCM/FCM. Once the lens mold tray is completely loaded with closed plastic lens molds BCM/FCM containing the lens-forming material, this lens mold tray 150 is raised by one step (of predetermined step height) and the next (empty) lens mold tray 150 is loaded with closed plastic lens molds BCM/FCM in the manner described above. Thereafter, this next lens mold tray 150 (now loaded with closed plastic lens molds BCM/FCM) is placed underneath the preceding lens mold tray 150 using a stacking robot (not shown in FIG. 9). Thereafter, the (incomplete) stack of two loaded lens molds trays 150 is raised again by one step, and the second next (empty) lens mold tray 150 is loaded with closed plastic lens molds BCM/FCM and is then stacked underneath this (incomplete) stack. Alternatively, instead of raising the lens mold tray 150 (or the incomplete stack of lens mold trays) no upward movement of the lens mold trays 150 (or the incomplete stack) may be performed, but rather the individual lens mold trays 150 may simply be stacked one above the other (the uppermost lens mold tray 150 always being the empty lens mold tray to be loaded with closed plastic lens molds BCM/FCM). In this case, however, the transfer robot 1470 must be configured to load the uppermost lens mold tray 150 at the respective level. However, in this case the transfer robot 1470 must be configured to load the closed plastic lens molds BCM/FCM on lens mold trays 150 at different levels, as the height of the (incomplete) stack is increasing in this case. In the first alternative (raising of the lens mold tray 150 or the incomplete stack, respectively), the first transfer robot 1470 must only be capable to transfer the closed plastic lens molds to the same level, thus allowing to keep the first transfer robot 1470 technically simple. By way of example, a complete stack of individual lens mold trays 150 may comprise a number of individual lens mold trays 150 that ranges from ten up to thirty-five, but any other number of individual lens mold trays 150 contained in the stack is conceivable as well. A limitation in this regard may be given, however, by the space available in the heating chamber of the ovens of the subsequent curing module, as will be explained in more detail below.

Lens mold trays suitable for this purpose are shown, for example, in WO 2018/178823. In WO 2018/178823 it is also shown that the closed plastic lens molds BCM/FCM are not placed directly on the surface of the lens mold tray, but are each placed on a plastic mold support mounted to the lens mold tray so that the closed plastic lens molds BCM/FCM are not in direct contact with the lens mold tray. This helps to ensure that heat is not unevenly transferred to the closed plastic lens molds BCM/FCM via the surface of the lens mold tray, but rather is uniformly transferred to the closed plastic lens molds (and thus to the lens-forming material contained therein) through the circulating heated gas atmosphere surrounding the closed plastic lens molds BCM/FCM arranged on the individual lens mold trays.

Turning back to the stack, once a said stack of lens mold trays 150 forms a completed stack 151 (with each lens mold tray 150 having the closed lens molds BCM/FCM containing the lens-forming material arranged thereon), such completed stack 151 is to be loaded into an oven 160 (see FIG.

10) of a curing module 16. An individual oven 160 comprises a heatable chamber 161 and a door (not shown) for opening and closing the oven 160. The curing module 16 further comprises a stack handling robot 162 (FIG. 1) for picking a completed stack 151 from the stacking module 15, transporting the completed stack 151 to one of the ovens 160 and placing the completed stack 151 into the heatable chamber 161 of the oven 160 (with the door of the oven 160 being open) and then closing the door of that oven 160. Thereafter, the oven may be flushed for considerable time with an inert gas to expel oxygen out of the oven down to an extremely low percentage of oxygen, e.g. to less than 1%, more preferably less than 0.5% or even down to 0.1%, as too high an oxygen content may inhibit the polymerization/crosslinking process during curing. Thereafter, the heatable chamber 161 may be heated to a desired temperature and be kept at this desired temperature for a predetermined duration. The desired temperature and the duration depend on the lens-forming material actually used. It is also possible that the lens-forming material is heated at a first temperature for a first predetermined duration in the heatable chamber 161, then the temperature in the heatable chamber 161 is raised to a second predetermined temperature and is kept at this second temperature for a second predetermined duration, and then the temperature in the heatable chamber 161 is raised to a third predetermined temperature and is kept at this third temperature for a third predetermined duration. Alternatively, depending on the lens-forming material used the heatable chamber 161 may be heated only to one single predetermined temperature and kept at this predetermined temperature without being lowered or raised during the curing process. By way of example, suitable temperatures may be taken from the range starting at 50° C. and ending at 120° C., without being limited to this range.

Once the stack carrying the plastic lens molds BCM/FCM has been exposed to the desired temperature(s) for the desired duration, the stack handling robot 162 takes the completed stack 151 out of the heatable chamber 161 (after having opened the door of the oven 160) and transfers the stack to a destacking module 17. The completed stack 151 now contains plastic lens molds BCM/FCM containing cured lenses. Such completed stack 151 with the plastic lens molds BCM/FCM containing the cured lenses is then destacked in the destacking module 17 with the aid of a destacking robot (not shown) by unstacking one individual lens mold tray 150 from the stack so that the plastic lens molds BCM/FCM of that unstacked individual lens mold tray are accessible. This unstacking operation in the destacking module 17 may be performed in the reverse order described for the stacking process performed in the stacking module 15 (FIFO, First In First Out). It is therefore referred to the description of the stacking process in the stacking module 15.

Next, a plurality of closed plastic lens molds BCM/FCM (again eight, by way of example, corresponding to one row on the lens mold tray 150) is transferred by a second transfer robot 180 (FIG. 11) to a demolding and delensing module 18 (FIG. 12) that generally comprises one out of two branches, a front curve demolding and delensing branch 181 and a base curve demolding and delensing branch 182 (but may also comprise both branches, with typically only one of them being used).

In the front curve demolding and delensing branch, the first station is a lens pre-release station. In this lens pre-release station 1810, for each base curve plastic lens mold a mechanical stamp 1812 is pressed against the back surface of the base curve plastic lens mold BCM in a portion surrounding the concave portion of the back surface, whereas the front curve plastic lens mold FCM is arranged on a support 1811. Through this mechanical pressure the cured (rigid) lens contained in the plastic lens mold BCM/FCM is released from the base curve plastic lens mold BCM and does not adhere to the base curve plastic lens mold BCM anymore. The plastic lens molds BCM/FCM are then forwarded to a demolding station 1813 where the base curve plastic lens molds BCM are opened to separate the base curve plastic lens molds BCM from the front curve plastic lens molds FCM. Opening of the plastic lens molds BCM/FCM is performed for each plastic lens mold BCM/FCM with the aid of a prying finger 1814 prying the base curve plastic lens mold BCM away from the front curve plastic lens mold FCM while at the same time a retainer 1815 holds the front curve plastic lens mold FCM down (on the support, not shown here) so that the base curve plastic lens mold BCM is separated from the front curve plastic lens mold FCM and is picked up with a suction cup 1816. As the cured lens has been pre-released from the base curve plastic lens mold BCM in the preceding step, it stays in the front curve plastic lens mold FCM. The cured lens must now be released from the front curve plastic lens mold FCM to which it adheres. This is done in a delensing station 1817 in which a pin 1818 presses against the convex outer back surface portion of the front curve plastic lens mold FCM while at the same time the front curve plastic lens mold FCM is held down by a retainer 1819. The cured lens CL that has been released from the front curve plastic lens mold FCM in this manner is then transferred to a treatment carrier tray 200 by a transfer gripper TG1 and placed into a basket 2000 of such treatment carrier tray 200. The afore-described operations are performed simultaneously for the eight plastic lens molds BCM/FCM which are concurrently processed.

In the base curve demolding and delensing branch 182, the first station is a demolding station 1820. In the demolding station 1820, a pin 1821 presses against the convex outer surface of the front curve plastic lens mold FCM as a retainer 1822 moves the front curve plastic lens mold downwards. Thus, the cured lens is released from the front curve plastic lens mold and adheres to the base curve plastic lens mold BCM which is at the same time picked up by a suction cup 1823. Now that the cured lens CL adheres to the base curve plastic lens mold BCM it must be released therefrom. For that purpose, an ultrasonic horn 1824 is placed against the back surface of the base curve plastic lens mold BCM, while the base curve plastic lens mold BCM rests on a support 1825. The ultrasonic vibrations introduced into the base curve plastic lens mold BCM causes the cured lens CL to be released from the base curve plastic lens mold BCM in a delensing station 1827. The released cured lens CL then rests on a receiver gripper 1826 (or a basket), from which the cured lens CL is then transferred to the treatment carrier tray 200 by a transfer gripper TG2 and placed into the basket 2000 of the treatment carrier tray 200.

Figure 2:
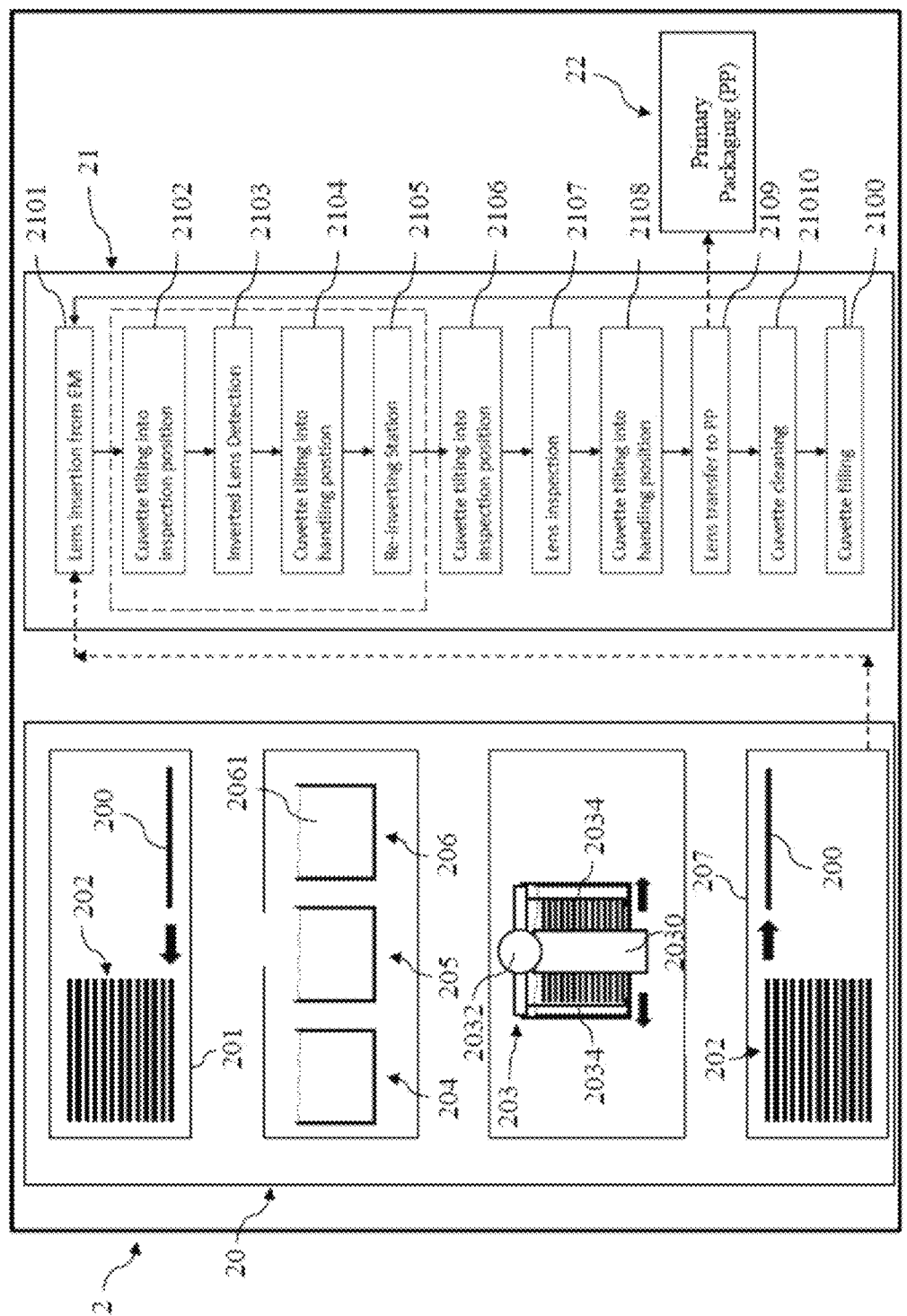
FIG. 2 shows an embodiment of a back end of the production line according to the invention.
Figure 7:
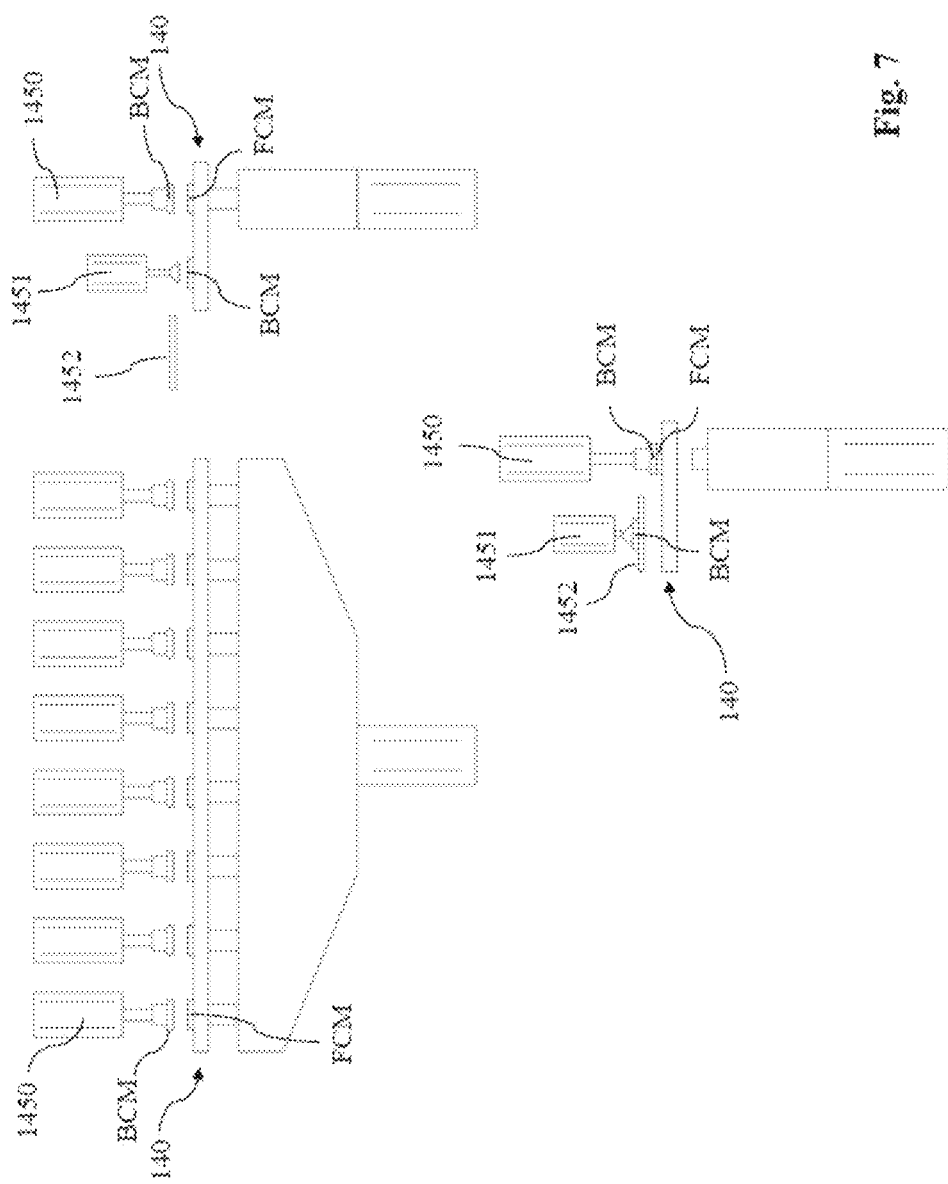
FIG. 7 shows the mover of FIG. 6 in a capping station in which base curve plastic lens molds from the preceding mover are placed onto the front curve plastic molds of the current mover (upper portion) with the aid of capping stamps to form closed plastic lens molds, and in which base curve plastic molds from the current mover are picked by a gripper and placed on an intermediate storage carrier (lower portion)

This treatment carrier tray 200 is already part of a treatment module 20 of a production line back end 2, an embodiment of which will be described in the following with reference to FIG. 2. FIG. 2 shows an embodiment of the back end 2 of the automated production line for the production of ophthalmic lenses, in particular contact lenses such as soft contact lenses, for example silicone hydrogel contact lenses, in accordance with the invention. The individual modules and components of the back end 2 will be discussed in more detail in the following. While FIG. 2 shows a general overview of the individual modules and components of production line back end 2, the modules and components will be described also with the aid of FIG. 13-FIG. 22.

Generally, the back end 2 comprises a treatment module 20 for a liquid bath treatment of the cured lenses CL carried by the treatment carriers 200. Depending on the type of lens-forming material used for forming the cured lenses CL, the liquid bath treatment may comprise a bath treatment in one or more of the following liquids (this list being only an example rather than being exhaustive, as the liquids depend on the lens-forming material used): water, an organic extraction liquid (e.g. a liquid containing propanol), a coating liquid (e.g. liquid containing polyacrylic acid, polymethacrylic acid), phosphate buffered water, or mixtures thereof.

At the time the cured lenses CL are transferred to the treatment carrier trays 200 from the demolding and delensing module 18 of the front end 1 with the aid of one of the transfer grippers TG1 or TG2 (see FIG. 12), the cured lenses CL are placed into the baskets 2000 of one individual carrier tray 200. Treatment carrier trays suitable for this purpose are disclosed, for example, in WO 2018/185630. To increase the efficiency of the bath treatment, a plurality of such treatment carrier trays 200 are stacked above each other in a treatment carrier tray stacking module 201 to form a stack 202 of treatment carrier trays 200 carrying the cured lenses CL. Such treatment carrier tray stacking module 201 is indicated in FIG. 2 and shown enlarged in the portion on the left-hand side of FIG. 13. The uppermost tray 200 of the stack 202 is not loaded with cured lenses CL and forms the lid of the stack so that the lenses of the second uppermost tray cannot get lost during transportation of the stack through the treatment module.

Figure 13:
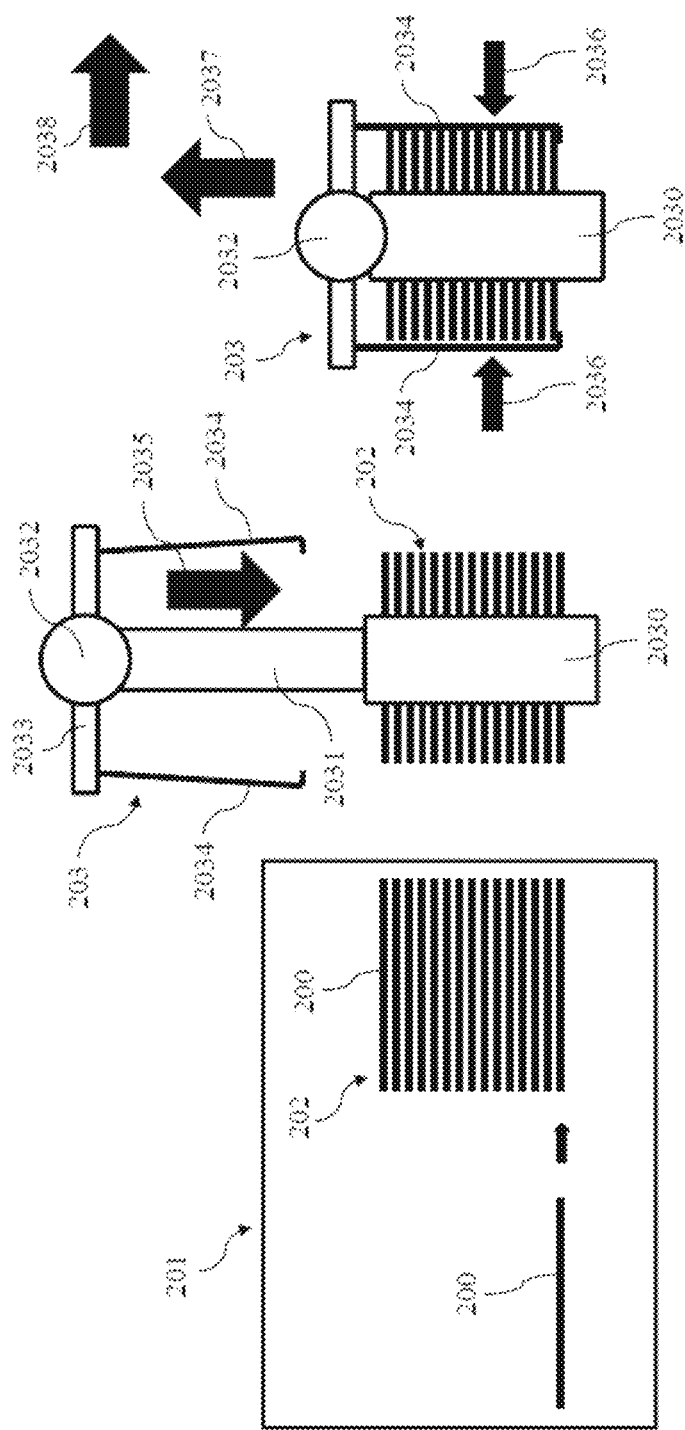
FIG. 13 shows a treatment carrier tray stacking station of the treatment module of the back end of the production line according to the invention, and a handling robot picking the stack of carrier trays carrying the cured lenses up.

Treatment module 20 further comprises a handling robot 203 which is configured to pick the stack 202 of treatment carrier trays 200, as this is shown in the middle of FIG. 13. Handling robot 203 comprises a base portion 2030 and a lifting arm 2031 that can be raised and lowered. At the upper end of lifting arm 2031 there is arranged a pivotal shaft 2032 to which a beam 2033 is attached. At each of the opposite ends of the beam 2033, a gripper arm 2034 is provided which can be laterally moved (or pivoted) towards and away from each other. To grasp a stack 202 of treatment carrier trays, the lifting arm 2031 of handling robot 203 is lowered as this is shown by the arrow 2035 shown in the middle of FIG. 13, with the gripper arms 2034 being in the position in which they have been moved (or pivoted) laterally away from each other. Once the lifting arm 2031 has been lowered, the gripper arms 2034 are moved laterally (or pivoted) towards one another as indicated by the arrows 2036 to grasp the stack 202 of treatment carrier trays 200, as is shown in the portion on the right-hand side in FIG. 13. The grasped stack 202 of treatment carrier trays containing the cured lenses CL is then lifted again, see arrow 2037, and is moved towards the plurality of treatment baths, as is indicated by arrow 238 in FIG. 13.

In FIG. 14 it is shown that the base portion 2030 moves the handling robot 203 with the lifted stack 202 towards a first bath 204 (see also FIG. 2) of a plurality of treatment baths, as shown in more detail in the outermost left portion of FIG. 14. This first bath 204 comprises a tank 2040 and a first treatment liquid 2041 which may be a coating liquid or an organic extraction liquid, for example. The robot 203 may then lower the stack 202 of treatment carrier trays 200 carrying the cured lenses CL into the first treatment bath 204, as this is shown in the second outermost left portion of FIG. 14. Next, the gripper arms 2034 of the handling robot 203 are moved away from each other again, and the lifting arm 2031 of handling robot 203 is raised again, see arrow 2037. The stack 202 has now been successfully placed into the first treatment bath 204 and may remain in the first treatment bath for a predetermined period of time to effect coating or extraction of the cured lenses CL. This state is shown in the outermost left portion of FIG. 15. During this period, the handling robot 203 is available for the handling of other stacks.

Once the predetermined period of time for treatment of the cured lenses CL in the first bath 204 is over, the handling robot 203 returns to the first treatment bath 204 again, with the lifting arm 2031 being raised and the gripper arms 2034 being moved away from each other, as this is shown in the second outermost portion of FIG. 15. The lifting arm 2031 is then lowered again and the gripper arms 2034 moved towards each other, see arrows 2036 shown in the second outermost right portion of FIG. 15. Thereafter, the lifting arm 2031 is raised again, as is indicated by the arrow 2037 in the outermost right portion of FIG. 15. This state in which the stack 202 that has been removed from the first bath 204 is still arranged above the tank 2040 containing the first treatment liquid 2041 is shown in the outermost left portion of FIG. 16.

Next, the stack 202—while still being arranged above the tank 2040 of the first treatment bath 204—is pivoted about the pivot shaft 2032 as this is indicated by the arrow 2039 shown in the second outermost portion of FIG. 16. This allows the first treatment liquid 2041 of the first bath still adhering to the cured lenses CL or the individual treatment carrier trays 200 of the stack 202 to flow back to the tank 2040 of the first treatment bath 204, as this is indicated by the droplets of the first treatment liquid 2041 and the arrows 2042 close to these droplets. This avoids that substantial portions of the first treatment liquid 2041 of the first bath 204 be entrained to the next bath which would contaminate the next bath. Once this action is completed, the stack 202 is tilted back and the handling robot 203 moves the stack 202 of treatment carrier trays 200 carrying the cured lenses to the second treatment bath of the plurality of treatment bath (or to an ophthalmic lens transfer station where the lenses are transferred to an inspection module). The handling robot 203 moving the stack 202 from the first treatment bath 204 comprising the tank 2040 and the first treatment liquid 2041 to the second treatment bath 205 comprising a tank 2050 and a second treatment liquid 2051, see arrow 2038, is shown in the second outermost right portion and in the outermost right portion of FIG. 16. The stack 202 is then lowered again and placed into the second bath 205 where the stack 202 remains for a predetermined period of time again, see left-hand portion of FIG. 17. For example, the treatment liquid 2051 of the second bath 205 may again be water, a coating liquid, an organic extraction liquid containing propanol, phosphate buffered water, or mixtures thereof. The process of placing the stack 202 into the second treatment bath 205 using the handling robot 203, lifting the stack 202 out of the second treatment bath 205, tilting the stack about the pivot shaft 2032, pivoting the stack back, and moving the stack to a third treatment bath 206 (see FIG. 2) comprising a treatment liquid is not described in detail again. In this regard, it is referred to the description above with respect to the first treatment bath 204. The last treatment bath is typically water or phosphate buffered water, depending on the lens-forming material. Thereafter, the cured lenses CL are extracted and/or coated and/or hydrated to finally form ophthalmic lenses which are carried by the individual treatment carrier trays 200 of the stack.

Evidently, many different types of treatment baths may be arranged in the treatment module of the production line, so that the cured lenses may be treated in different treatment baths for different periods of time depending on the lens-forming material actually used. Typically, two or more baths of each type of treatment baths/different treatment liquids may be provided in the treatment module, so that it is possible to concurrently produce ophthalmic lenses made of different lens-forming materials in the production line, thus rendering the production line very flexible with respect to the lens-forming material used. Also, ophthalmic lenses made of different lens-forming materials may be (concurrently or sequentially) produced in the same production line. While this may require the provision of different treatment baths and/or may require that the ovens be flushed with different amounts and/or different degrees of purity of the inert gas, it is possible to produce the ophthalmic lenses made of different lens material using the same concept of the production line. This renders the production line extremely flexible.

Alternatively, only ophthalmic lenses made of the same lens-forming material may be concurrently produced in the production line, however, due to two or more baths of each type being provided in the treatment module a high number of ophthalmic lenses can be concurrently produced (in stacks) in the production line, thus rendering the production line very efficient.

After treatment in the last treatment bath is completed, the stack 202 is transferred to an ophthalmic lens transfer station 207 (see FIG. 2) which is shown enlarged in FIG. 17. In this ophthalmic lens transfer station 207, a destacking robot (not shown) destacks the individual treatment carrier trays 200 now containing the ophthalmic lenses to allow the ophthalmic lenses to be transferred from the individual treatment carrier trays 200 to an inspection module 21. Destacking and transfer of the ophthalmic lenses to the inspection module 21 may be performed by lifting the stack 2020 out of the last treatment bath, typically water or phosphate buffered water, such that only the uppermost treatment carrier tray 200 that carries ophthalmic lenses (note that prior to destacking the baskets of the uppermost treatment carrier tray 200 of the stack 202 do not contain any ophthalmic lenses as this uppermost treatment carrier tray forms the lid of the stack) is lifted above the level of the surface of the water while the rest of the treatment carrier trays 200 of the stack 202 remain immersed in the water. The ophthalmic lenses are then picked from the baskets of this uppermost treatment carrier tray 200 (using conventional grippers, for example) and transferred to the inspection module. Alternatively, this uppermost carrier tray 200 is first removed from the stack and moved to a separate location in the lens transfer station 207 whereupon the ophthalmic lenses are picked from the baskets and transferred to the inspection module, as this is indicated on the right-hand portion of FIG. 17.

Inspection of the ophthalmic lenses is described in the following with the aid of FIG. 2 and FIG. 18-22. One embodiment of the inspection module 21 is shown schematically in FIG. 20. The operations which are performed in the various stations of the inspection module 21 arranged along a closed-loop rail 210 (the path being schematically shown in FIG. 21) are shown in more detail in FIG. 22. While the path of the closed-loop rail 210 is shown in FIG. 21 to have corners, this is for the sake of simplicity of the drawing only since in practice the path is curved to allow the shuttle to drive through the curves of the closed-loop rail 210. The geometry of the path of the closed-loop rail 210 (i.e. the course of the path) can be freely chosen and can be determined, for example, to best fit the free space of the room where the inspection module 21 of the production line is arranged. This option to freely choose the geometry of the path of the closed-loop rail 210 is very advantageous as it allows to optimally fit the inspection module 21 to the available space.

Transportation of the ophthalmic lenses through the various stations of the inspection module 21 which are arranged along the closed-loop rail 210 is performed with the aid of a plurality of self-driving shuttles 211 arranged on the closed-loop rail 210. Such self-driving shuttles 211 may be shuttles of the type MONTRAC® SHUTTLE MSH4 available from the company montratec GmbH, Johann-Liesenberger-Strasse 7, 78078 Niedereschach, Germany. These self-driving shuttles 210 are equipped with a driving unit 2114 for moving the respective shuttle 211 along the closed-loop rail 120, and with sensors for detecting a leading shuttle 211 in front of the respective (trailing) shuttle 211 on the closed-loop rail 210. Thus, when the trailing shuttle 211 approaches the leading shuttle 211, the sensors of the trailing shuttle 211 reduce the travelling speed of the trailing shuttle 211 to avoid collision. If necessary, the speed of the trailing shuttle 211 may even be reduced to zero (i.e. the trailing shuttle 211 is caused to stop). In addition, at each of the various stations arranged along the closed-loop rail 210, the shuttles 211 are also caused to stop to allow the respective operation to be performed in the respective station of the inspection module 21. The self-driving shuttles 211 are also advantageous as they allow for movement along the closed-loop rail 210 whenever there is sufficient free space ahead (i.e. no leading shuttle 211 at too small a distance ahead). Also, in case there is a small delay in transferring further ophthalmic lenses from the treatment module 20 to the inspection module 21 (e.g. caused by small delays or interruptions of the treatment module 20), the shuttles 211 on the closed-loop rail 210 other than the shuttle 211 waiting for the ophthalmic lenses to be transferred may continue their movement along the closed-loop rail 210. Once the shuttle 211 waiting for the ophthalmic lenses has received the ophthalmic lenses with a small delay, the shuttle 211 may catch up on the leading shuttle as it does not have to wait or reduce speed but may even speed up movement along the closed-loop rail 210 (except that the shuttle 210 must stop at each station to allow the respective operation to be performed). This means that the production line is allowed to 'breathe' to some extent (i.e. delays in performing certain operations can be compensated for without interruption of the production line).

Each self-driving shuttle 211 carries a plurality of inspection cuvettes 2110, and in the embodiment shown in FIG. 18 and FIG. 19 the total number of cuvettes 2110 arranged on one shuttle 211 is thirty-two, with sixteen cuvettes being arranged in a row, respectively. The cuvettes 2110 of one row are arranged on a web 2111 which can be tilted from a handling position shown in FIG. 18, in which the ophthalmic lenses can be inserted into and removed from the cuvettes 2110 through a handling opening 2112 of the cuvettes 2110 with the aid of known grippers (indicated by the dashed double-headed arrows), and an inspection position shown in FIG. 19, in which the ophthalmic lenses can be inspected through the viewing glasses 2113 of the cuvettes 2110 with the aid of one or more cameras (not shown). The cuvettes 2110, the process of inserting the ophthalmic lenses into and removing the ophthalmic lenses from the cuvettes 2110 when they are arranged in the handling position, the tilting of the cuvettes 2110 from the handling position to the inspection position, and the inspection of the ophthalmic lenses in the cuvettes 2110 through the viewing glass 2113 when they are arranged in the inspection position are well-known and described, for example, in WO 03/016855 or in WO 2007/042280.

Figure 22:
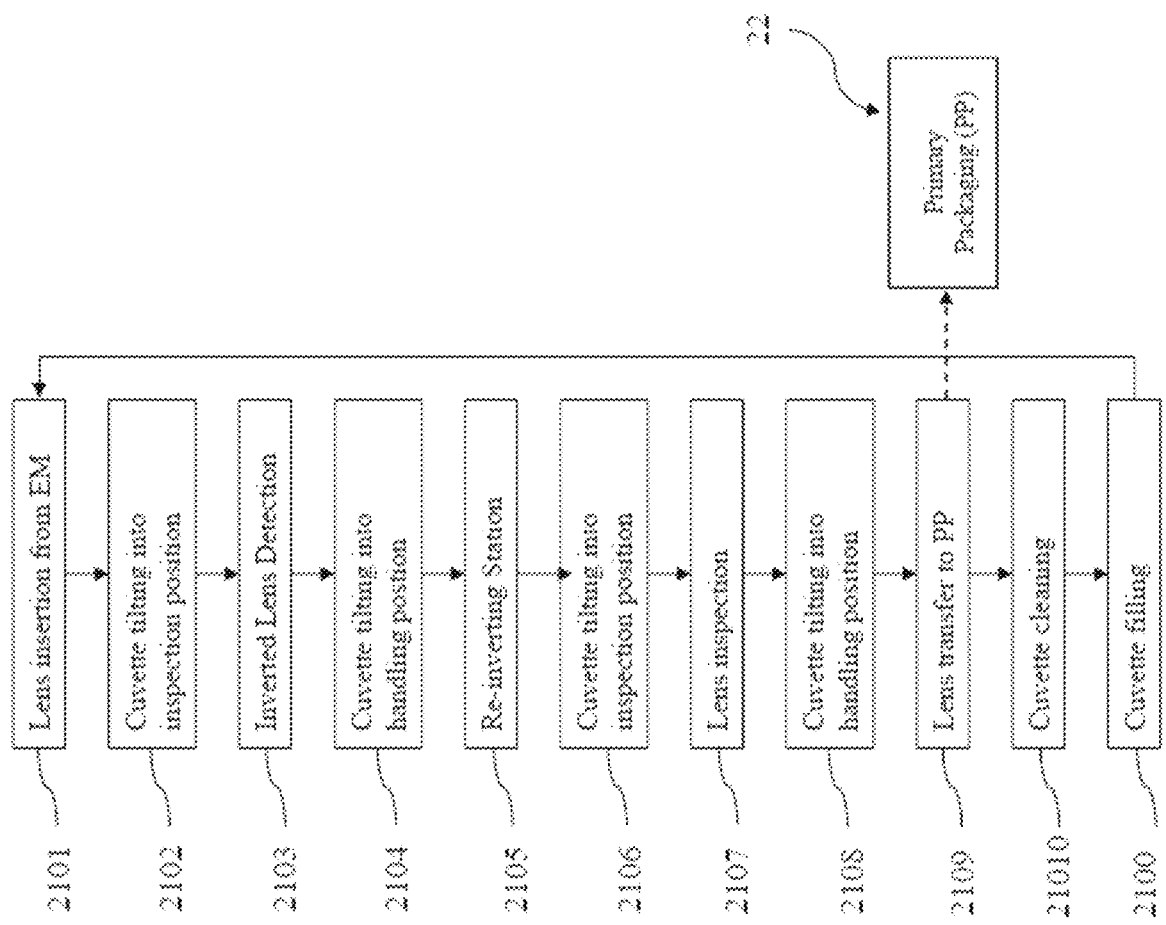
FIG. 22 shows a flow diagram of the various stations of the inspection module shown in FIG. 20.

Turning now to the various stations arranged along the closed-loop rail 210, these are explained with the aid of FIG. 20, FIG. 21 and FIG. 22. The first station arranged along the closed-loop rail is a cuvette filling station 2100 (in general it does not matter which station is called the 'first' station arranged along the closed-loop rail 210; for example, the lens insertion station explained in the following may be called the 'first' station as well, see flow chart shown FIG. 22, which would cause the filling station 2100 to be the 'last' station arranged along the closed-loop rail 210). In the cuvette filling station 2100, the cuvettes 2110 arranged on the shuttles 211 are arranged in the handling position to allow liquid (water) to be filled into the cuvettes 2110 through the handling openings 2112 to make the cuvettes 2110 ready for the insertion of the ophthalmic lenses to be inspected. The next station arranged along the closed-loop rail 210 is the lens insertion station 2101 in which the ophthalmic lenses are transferred from the treatment module 20 to the inspection module 21, i.e. the ophthalmic lenses are inserted into the cuvettes 2110 with the aid of conventional grippers. The next station arranged along the closed-loop rail 210 is an initial cuvette tilting station 2102. In this initial cuvette tilting station 2102 the cuvettes 211 are tilted from the handling position to the inspection position by pivoting the webs 2111 on which the cuvettes 2110 are arranged. Next, in an inversion detection station 2103 the ophthalmic lenses are inspected as to whether they are properly oriented or whether they are inverted (turned inside out). The next station is an initial tilting-back station 2104 in which the cuvettes 2110 are tilted back to the handling position. Next, in a re-inverting station 2105 the ophthalmic lenses are re-inverted to the proper orientation in case in the inversion detection station 2103 it has been detected that the ophthalmic lenses are inverted. Such re-inversion of an inverted ophthalmic lens to the proper orientation is well-known and is described, for example, in WO 2009/103732. The initial cuvette tilting station 2102, the inversion detection station 2103, the initial tilting back station 2104, and the re-inverting station 2105 are preferably provided in the inspection module, however, in general they are optional. Thus, in other embodiments of the inspection module 21 in which ophthalmic lenses are inspected which are not prone to inversion (in contrast to silicone hydrogel contact lenses which are extremely flexible and for which inversion may occur), these stations can be omitted.

Next, the cuvettes 2110 are tilted in a first cuvette tilting station 2106 to the inspection position. In the subsequent lens inspection station 2107 the ophthalmic lenses are inspected through the viewing glasses 2113 of the cuvettes 2110, for example with the aid of one or more cameras (not shown) and image-processing, as this is well-known in the art. Inspection of the ophthalmic lenses may comprise the inspection of the ophthalmic lenses for cosmetic defects, edge defects, inclusions (such as bubbles or other inclusions), but may also comprise the determination of the lens central thickness or optical parameters (e.g. diopter) of the ophthalmic lenses. This is also well-known in the art. For example, inspection of the ophthalmic lenses may occur when the shuttle 211 enters the lens inspection station 2107, i.e. the camera or cameras may be fixedly arranged and the ophthalmic lenses are inspected as the shuttle 211 is moving into the lens inspection station 2107. Alternatively, inspection of the ophthalmic lenses may occur while the shuttle 211 is arranged in the lens inspection station 2107 and does not move. In this case, the camera or cameras may be moved along the rows of cuvettes 2110 arranged in the shuttle 211. Thereafter, the cuvettes 2110 are tilted back to the handling position again in a first cuvette tilting-back station 2108.

The cuvettes are then transported to an ophthalmic lens transfer station 21009 in which those ophthalmic lenses that have successfully passed the inspection are transferred to the primary packaging shells waiting in a primary packaging module 22 for the ophthalmic lenses to be transferred. This transfer can be performed with grippers suitable for this purpose, for example those disclosed in WO 2011/026868 or in WO 2020/084573. Primary packaging shells suitable for the packaging of the ophthalmic lenses are disclosed, for example, in WO 2019/180679. The ophthalmic lenses that have not successfully passed the inspection are not transferred to the primary packaging module. In the subsequent cuvette cleaning station 21010 the water is sucked from the cuvettes, and the ophthalmic lenses that have not successfully passed the inspection are sucked from the cuvettes together with the water and are filtered from the water and disposed of.

In the primary packaging module 22, the bowls of the primary packaging shells waiting for the lenses to be transferred may already have been filled with a small fraction of the volume of a storage liquid (e.g. saline with or without additional agents) to be dispensed into the respective bowl, and after the ophthalmic lenses have been transferred the rest of the full amount of storage liquid is dispensed into the bowl. The primary packaging shells are then covered with a foil which is subsequently sealed onto the packaging shells, as this is well-known in the art. Information about the ophthalmic lens contained in the packaging shell may then be printed onto the foil using laser-printing or other printing techniques, and finally the thus formed primary packages are placed into magazines for autoclaving. This is well-known in the art and is therefore not described in more detail here.

One particular aspect of the production line according to the invention is described in the following with the aid of FIG. 23-FIG. 32. This aspect deals with the capability of the production line to allow for a fast lot change despite the injection molding machines being operated at (and thus heated to) high temperatures to inject the flowable plastic material for the front curve plastic lens molds and the base curve plastic lens molds. Typically, a lot change then requires that the whole injection-molding machine be cooled down to a temperature at which an exchange of the elements determining the shape of the front curve plastic lens molds and the base curve plastic lens molds produced with the respective injection-molding machine is possible. This results in very considerable downtime of the production line, as such cooling process may take hours.

In the injection-molding machines used in the production line according to the invention such downtime of the production line during a lot change can be very substantially reduced, as is explained in the following with the aid of the first injection-molding machine 10 for molding the front curve plastic lens molds FCM, but similar considerations hold for the second injection-molding machine for molding the base curve plastic lens molds BCM.

Figure 24:
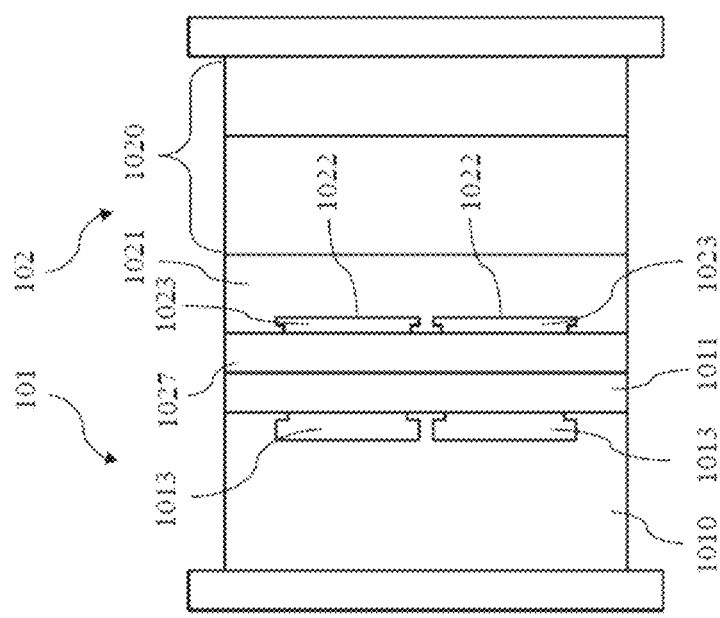
FIG. 24 shows a side view of the first and second tool halves shown in FIG. 23 (tool halves in closed position)
Figure 23:
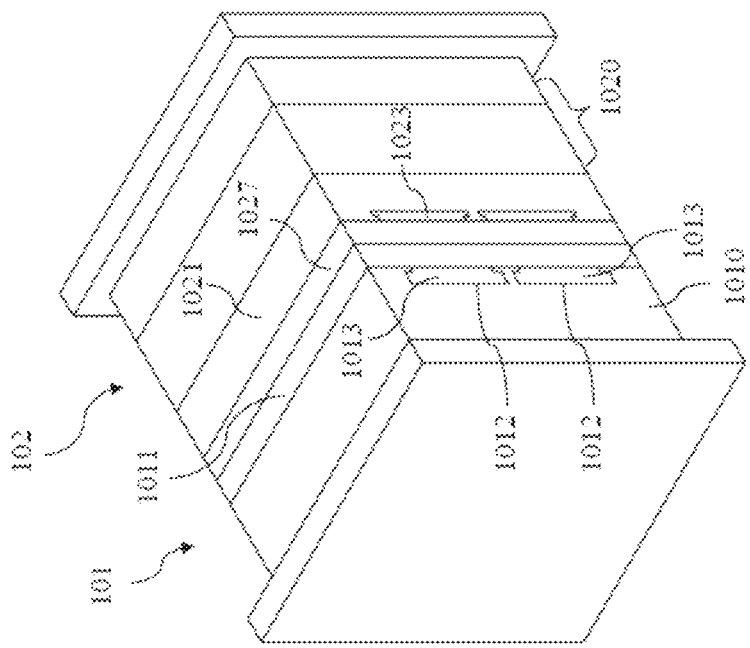
FIG. 23 shows a perspective view of an embodiment of the first and second tool halves of the first injection-molding machine for injection-molding of the front curve plastic lens molds (tool halves in closed position)

As can be seen in FIG. 23 and FIG. 24 the first injection-molding machine 10 comprises a first tool half 101 and a second tool half 102. The first tool half 101 and the second tool half 102 are movable relative to one another between a closed position for injection-molding of the front curve plastic lens molds FCM and an open position in which the molded front curve plastic lens mold FCM is removed from the injection-molding machine. While generally it is possible that both tool halves are movable towards and away from each other, in the embodiment shown only the second mold half 102 is movable towards and away from the first mold half 101 which is fixedly arranged (alternatively, the second mold half 102 may be fixedly arranged while only the first mold half 101 is movable towards and away from the second mold half 102). As can be seen in FIG. 23 and FIG. 24, the first mold half 101 comprises a first fixed block 1010 and a first alignment plate 1011 releasable mounted to the first fixed block 1010. The first fixed block comprises a first slot 1012 (in the embodiment shown two such first slots 1012) accommodating a first tooling plate 1013 (in the embodiment shown two such first tooling plates 1013) to which a plurality of individual first sleeves 1014 are pre-mounted (see FIG. 25). Each individual first sleeve 1014 has an individual optical tool insert 1015 mounted thereto (see FIG. 27), and this individual optical tool insert 1015 determines the shape of the concave optical front surface of the front curve plastic lens mold FCM. The first alignment plate 1011 comprises a plurality of through-openings 1016 (see FIG. 25), and during assembly of the first tool half 101 each of these through-openings 1016 accommodates one of the first sleeves 1014 pre-mounted to the first tooling plate 1013 when the first tooling plate 1013 is completely inserted into the first slot 1012 and the first alignment plate 1011 is thereafter mounted to the first fixed block 1010. This provides for an individual alignment of each individual first sleeve 1014 (and thus of each individual optical tool insert 1015) at the time the first alignment plate 1011 is mounted to the first fixed block 1010. This assembled state of the first tool half 101 can be seen best in FIG. 28 (although the first too half 101 and the second tool half 102 are shown in the open position there).

Similarly, the second tool half 102 comprises a second fixed block 1020, to which a mounting plate 1021 is releasably mounted. This mounting plate 1021 comprises a second slot 1022 (in the embodiment shown two such second slots 1022) accommodating a second tooling plate 1023 (in the embodiment shown two such second tooling plates 1023) to which a plurality of individual second sleeves 1024 are pre-mounted (see FIG. 26). Each individual second sleeve 1024 has an individual back piece insert 1025 mounted thereto (see FIG. 28), and this individual back piece insert 1025 determines the shape of the convex non-optical back surface of the front curve plastic lens mold FCM. The mounting plate 1021, the second tooling plate 1023 and each second sleeve 1024 are further provided with hot runner through-holes (the hot runner through-hole 10240 of the second sleeve 1024 being indicated in FIG. 26) accommodating (hollow) hot runner pipes 1026 for the injection of the thermoplastic material. These hot runner pipes 1026 are arranged in the second fixed block 1020 and extend out of the second fixed block 1020 towards the first tool half 101 (see FIG. 29, the grooves 1017 of the first alignment plate 1011 not being shown there). The second tool half 102 further comprises a second alignment plate 1027 that comprises a plurality of through-openings 1028 (see FIG. 26). During assembly of the second tool half 102, each of these through-openings 1028 accommodates one of the second sleeves 1024 pre-mounted to the second tooling plate 1023 when the second tooling plate 1023 is completely inserted into the second slot 1022 and the second alignment plate 1027 is thereafter mounted to the mounting plate 1021. This provides for an individual alignment of each individual second sleeve 1024 (and thus of each individual back piece insert 1025) at the time the second alignment plate 1027 is mounted to the mounting plate 1021. However, unlike the first alignment plate, the second alignment plate 1027 is not fixedly mounted to the mounting plate 1021 but remains movable a short distance away from the mounting plate 1021, as this can be seen best in FIG. 28 and FIG. 29. In the open position (first tool half 101 and second tool half 102 being arranged away from each other as shown in FIG. 28 and FIG. 29), the second alignment plate 1027 is pre-biased to be arranged at this short distance away from the mounting plate 1021 for reasons which are explained further below. This short distance between the mounting plate 1021 and the second alignment plate 1027 does not exist when the first tool half 101 and the second tool half 102 are in the closed position shown in FIG. 23 and FIG. 24.

Figure 25:
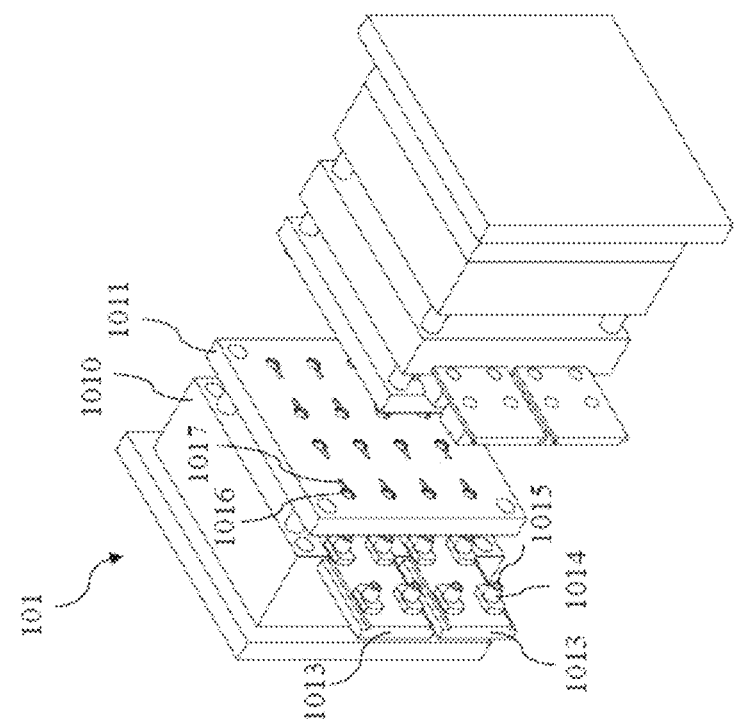
FIG. 25 shows a perspective view of the first and second tool halves shown in FIG. 23 and FIG. 24 (tool halves in open position) illustrating the change of the first tooling plate.

In FIG. 25 it can be seen that the first alignment plate 1011 further comprises a plurality of straight grooves 1017, with each straight groove 1017 opening out into the associated through-opening 1016 accommodating the first sleeve 1014 to which the optical tool 1015 is mounted. This groove 1017 is shaped to form the tab T1 of the front curve plastic lens mold FCM (see FIG. 7). When the first tool half 101 and the second tool half 102 are in the closed position (see FIG. 30, FIG. 31 and FIG. 32), a flowable thermoplastic material (e.g. polypropylene) is injected at high temperature and high pressure through the tapering end of a respective hot runner pipe 1026 (see FIG. 32) into a respective groove 1017 (the groove 1017 not being shown in FIG. 32). The injected flowable thermoplastic material flows along the groove 1017 (FIG. 25) into the space 1018 (FIG. 31) formed between the optical tool 1015 and the back piece 1025 while thermoplastic material continues to be injected into the groove 1017 until the space between the optical tool 1015 and the back piece 1025 as well as the groove 1017 are completely filled with flowable thermoplastic material. While the hot runner pipes 1026 must be kept at high temperature (the flowable thermoplastic material must not be allowed to cool down in the hot runner pipes 1026 to a temperature at which it may solidify, otherwise the hot runner pipes 1026 are getting clogged), the first fixed block 1010, the first alignment plate 1011 and the first tooling plate 1013 to which the first sleeves 1014 are pre-mounted to which the optical tool inserts 1015 are mounted must be kept at a temperature that allows the injected flowable thermoplastic material to quickly cool down to a temperature at which it solidifies at least to a state that allows for the removal of a thus formed front curve plastic lens mold FCM. This holds, too, for the second fixed block 1020, the mounting plate 1021, the second tooling plate 1023 to which the second sleeves 1024 are pre-mounted to which the back piece inserts 1025 are mounted, and for the second alignment plate 1027.

Once the injected thermoplastic material has solidified as described above to form the front curve plastic lens mold FCM (the first tool half 101 and the second tool half 102 still being in the closed position), the second tool half 102 is moved away from the first tool half 101 into the open position (see FIG. 27, FIG. 28 and FIG. 29). This is a critical moment since the front curve plastic lens mold FCM may either adhere to the first tool half 101 or to the second tool half 102. For a reliable set-up of the process, it must be made sure that the front curve plastic lens mold FCM predictably adheres to only one of the first tool half 101 and the second tool half 102. In the embodiment described, it is made sure that the front curve plastic lens mold FCM predictably adheres to the first tool half 101. This is achieved with the aid of the second alignment plate 1027 which—upon moving the second tool half 102 away from the first tool half 101—is moved the above-discussed short distance away from the mounting plate (it is biased towards this position, see above), thus releasing the front curve plastic lens mold FCM from the back piece insert 1025. The second alignment plate 1027 therefore acts as a strip-off plate that releases the front curve plastic lens mold FCM from the back piece insert 1025 upon moving the second tool half 102 away from the first tool half 101. As a result, the front curve plastic lens mold FCM predictably adheres to the first tool half 101. A gripper tool 100 (see FIG. 4) with suction cups 1000 is thereafter inserted into the space formed between the first tool half 101 and the second tool half 102 to remove the front curve plastic lens molds FCM from the first tool half 101 with the aid of suction applied to suction cups 1000 of the gripper tool 100, as this is described, in principle, in WO 2020/144622. Additional measures to release a plastic lens mold from a particular tool half or to make a plastic lens mold adhere to a particular tool half are also described in the afore-mentioned WO 2020/144622, as well as in WO 2020/109976. After having removed the front curve plastic lens molds FCM from the first tool half 101 by gripping them with the gripper tool 100, the gripper tool 100 is removed from the space between the first tool half 101 and the second tool half 102, the front curve plastic lens molds FCM are transferred to the front curve plastic lens mold buffer module 11, the second tool half 102 is moved towards the first tool half 101 to the closed position, and the next shot of flowable thermoplastic material is injected through the hot runner pipes 1026 as described above.

The cycle time for the whole process described above (i.e. moving the second tool half 102 towards the first tool half 101 to the closed position, injecting the flowable thermoplastic material, moving the second tool half 102 away from the first tool half 101 to the open position, inserting the gripper tool into the space formed between the first tool half 101 and the second tool half 102, removing the front curve plastic lens molds FCM from the first tool half 101 through the application of suction to make the front curve plastic lens molds FCM adhere to the gripper tool, and removing the gripper tool from the space between formed between the first tool half 101 and the second tool half 102) is extremely short, and is less than ten seconds, in particular less than five seconds, and preferably two to five seconds. By way of example, this cycle time may be as short as two, three, four or five seconds, in particular about four seconds. Such a short cycle time renders the production line according to the invention particularly efficient.

The description above holds similarly for the second injection-molding machine 12, which comprises a third tool half 121 and a fourth tool half 122 (see FIG. 3 and FIG. 4) for concurrently producing a plurality of base curve plastic lens molds BCM. The number of base curve plastic lens molds BCM concurrently produced with the second injection-molding machine 12 corresponds to the number of front curve plastic lens molds FCM concurrently produced with the first injection-molding machine 10, and the cycle time of the second injection-molding machine 12 is also identical with the cycle time of the first injection-molding machine 10. This means, that within one cycle (i.e. within the same cycle time) the same number of front curve plastic molds FCM and base curve plastic molds BCM are produced.

Unlike in the first injection-molding machine 10, in the second injection molding machine 12 the optical tool inserts are arranged in the movable third tool half 121 shown in FIG. 3 and FIG. 4. The third tool half 121 has a similar three-plate construction as the second tool half 102 described above. The back piece inserts are arranged in the fixedly arranged fourth tool half 122. Otherwise, the construction of the third tool half 121 is similar to that of the second tool half 102 described above, and the construction of the fourth tool half 122 is similar to that of the first tool half 101 described above. Therefore, with respect to a description of the detailed construction of the third tool half 121 and the fourth tool half 122 it is referred to the description of the second tool half 102 and the first tool half 101 above.

Figure 26:
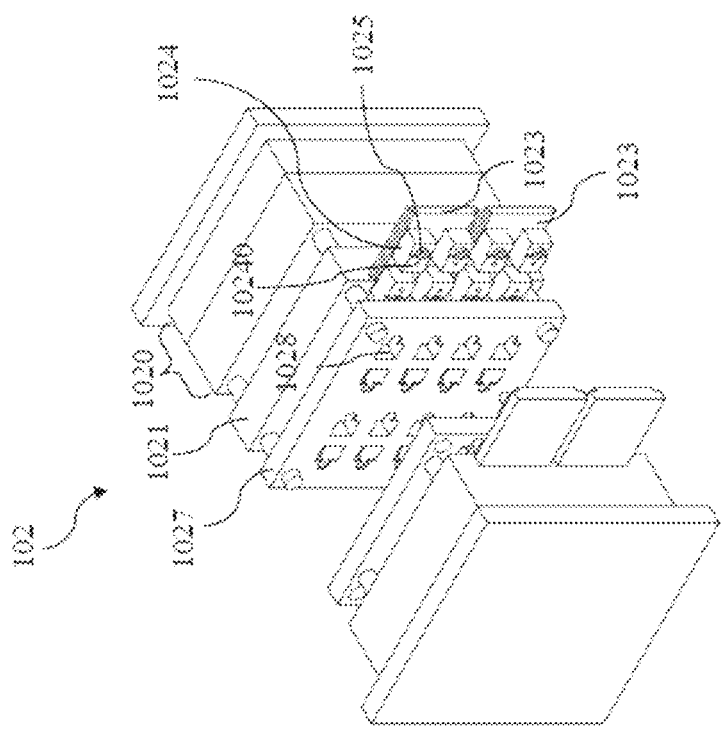
FIG. 26 shows a perspective view of the first and second tool halves shown in FIG. 23 and FIG. 24 (tool halves in open position) illustrating the change of the second tooling plate.

Tuning back to FIG. 25 and FIG. 26, in the embodiment shown there sixteen front curve plastic lens molds FCM are concurrently produced within one cycle. Similarly, sixteen base curve plastic lens molds are concurrently produced within one cycle. Assuming that the same lens-forming material is used to manufacture the ophthalmic lenses using these front curve plastic lens molds FCM and base curve plastic lens molds BCM this means that it is possible to concurrently produce up to sixteen different ophthalmic lenses, these ophthalmic lenses being different in at least one property (i.e. front curve geometry, diopters, toric parameters, rotational stabilization features, etc.).

However, the flexibility of the production line according to the invention goes far beyond that. For example, after a predetermined number of ophthalmic lenses has been manufactured using a first lens-forming material and using the front curve plastic lens molds FCM and base curve plastic lens molds BCM described, it is possible to switch to a different lens-forming material. To achieve this, it is simply necessary to dose a different lens-forming material into the front curve plastic lens molds FCM in the filling station 144. In addition, the use of a different lens forming material may require different temperature profiles and exposure times in the heating chamber 161 of the oven 160 to cure the different lens-forming material contained in the closed plastic lens molds BCM/FCM. Additionally, a different level of oxygen may be admissible in the heating chamber 161 of the oven 160, so that the gas atmosphere in the heating chamber of the oven 160 must be inert to a higher or lower degree, depending on the lens-forming material actually used. Yet further, in the treatment module 21 the treatment liquids contained in the tanks of the treatment baths to which the cured lenses CL must be exposed may be different. Also, the duration of exposure to the treatment liquids may be different, depending on the lens-forming material actually used. For example, some lens-forming materials may require a coating to be applied to the cured lens, while other lens-forming materials may not require such coating or even prohibit the application of a coating to the cured lens. Further by way of example, some lens-forming materials may require organic extraction liquids for the extraction while other lens-forming material may only require extraction in water. In case various types of treatment baths are provided in the treatment module 21 of the production line according to the invention it is possible to concurrently produce ophthalmic lenses of different lens-forming materials in the production line according to the invention, all the more since the production of ophthalmic lenses made from a particular lens-forming material may take some hours before the ophthalmic lenses are cured, chemically treated, inspected and packaged. Especially the curing process, but also the chemical treatment process may be time-consuming. The production line according to the invention is capable of dealing with a high number of such different requirements, and is therefore very flexible, also with respect to concurrently producing in the production line ophthalmic lenses made from different lens-forming materials.

Another aspect rendering the production line according to the invention very flexible is the capability of quickly performing a lot change. By way of example, a lot change is explained in the following for the front curve plastic lens molds FCM. To perform a lot change, at least the optical tool inserts 1015 mounted to the first sleeves 1014 pre-mounted to the first tooling plate 1013 must be changed (as these optical tool inserts 1015 determine the geometrical shape of the optical surface of the front curve plastic lens molds FCM). In addition, in many instances the back piece inserts 1025 mounted to the second sleeves 1024 pre-mounted to the second tooling plate 1023 must then be changed as well (these back piece optical tool inserts 1025 determining the geometrical shape of the non-optical back surface of the front curve plastic lens molds FCM).

To perform a change of the optical tool inserts 1015 mounted to the first sleeves 1014, the second tool half 102 is moved away from the first tool half 101 (open position). The first alignment plate 1011 of the first tool half 101 is then demounted from the first fixed block 1010 and is moved away from the first fixed block 1010, so that the first sleeves 1014 pre-mounted to the first tooling plate 1013 are no longer accommodated in the through-holes 1016 of the first alignment plate 1011. Thereafter, the first tooling plate 1013 with the pre-mounted first sleeves 1014 to which the old first optical tool inserts 1015 are mounted (which are to be replaced) is unfixed and pulled out of the first slot 1012 (see FIG. 25). A new first tooling plate 1013 with pre-mounted first sleeves 1014 to which the new (i.e. different) optical tool inserts 1015 are mounted is then slidably inserted into the first slot 1012 and is fixed. Thereafter, the first alignment plate 1011 is moved towards the first fixed block 1010 and is mounted to the first fixed block 1010 again. The first sleeves 1014 of the new first tooling plate 1013 to which the new optical tool inserts 1015 are mounted are then accommodated in the through-openings 1016 of the first alignment plate 1011 again, and the change is completed. Evidently, this change can be performed in a short time as the new first tooling plate 1013 can be equipped with the first sleeves 1014 and the new optical tool inserts 1015 remote from the production line and well in advance of such change, so that at the time of the change only the afore-described change of the first tooling plate 1013 must be performed. Also, the change can be easily and quickly performed as the entire first tool half 101 has an uncritical temperature allowing to handle the first tooling plate 1013.

With respect to a change of the optical tool inserts 1025 mounted to the second sleeves 1024 of the second tooling plate 1023, the situation is different. The reason for this is that the second tool half 102 also comprises the hot runner pipes 1026 which are at high temperature since the flowable (hot) thermoplastic material is injected through these hot runner pipes 1026. Waiting until these hot runner pipes 1026 have cooled down to an uncritical temperature would render the change of the second tooling plate 1023 highly inefficient, as this would take very considerable time during which no production of ophthalmic lenses is possible in the production line. Also, in case the hot runner pipes 1026 were allowed to cool down, they would have to be heated to the required temperature after the change of the second tooling plate 1023. This heating of the hot runner pipes 1026 would again take some time, thus rendering the change of the second tooling plate 1023 inefficient.

To perform the change of the second tooling plate, the second alignment plate 1027 is demounted from the mounting plate 1021 and is moved away from the mounting plate 1021 until the second sleeves 1024 to which the back piece inserts 1025 are mounted are no longer accommodated in the through-openings 1028 of the second alignment plate 1027 (see FIG. 26). Next, the mounting plate 1021 is demounted from the second fixed block 1020 and is moved away from the second fixed block 1020. Thus, the mounting plate 1021 is separated from the second fixed block 1020 comprising the hot runner pipes 1026. Due to this separation, it is possible to on one hand maintain the high temperature of the hot runner pipes 1026 while on the other hand being able to perform the change of the second tooling plate 1023 without being negatively impacted by the high temperature of the hot runner pipes 1026.

To effect the change of the second tooling plate 1023, the second tooling plate 1023 is unfixed and pulled out of the slot 1022 provided in the mounting plate 1021. The new second tooling plate 1023 comprising the pre-mounted second sleeves 1024 with the new (i.e. different) back piece inserts 1025 mounted thereto is then slidably inserted into the second slot 1022 and fixed therein. Thereafter, the mounting plate 1021 is mounted to the second fixed block 1020 again, and the second alignment plate 1027 is mounted to the mounting plate 1021. Also here, this change can be performed in a short time as the new second tooling plate 1023 can be equipped with the first sleeves 1024 and the new back piece inserts 1025 remote from the production line and well in advance of such change, so that at the time of the change only the afore-described change of the second tooling plate 1023 must be performed. Also, the change can be performed at an uncritical temperature, while at the same time it is possible to maintain the high temperature of the hot runner pipes 1026. This allows to rapidly resume production after the change of the second tooling plate 1023 is completed.

The description of the change of the tooling plates similarly applies to the second injection-molding machine 12 and the third tool half 121 and fourth tool half 122 thereof (see FIG. 3 and FIG. 4). As mentioned already, unlike in the first injection-molding machine 10, in the second injection molding machine 12 the optical tool inserts are arranged in the movable third tool half 121 which has a similar three-plate construction as the second tool half 102 described above. The back piece inserts are arranged in the fixedly arranged fourth tool half 122. Otherwise, the construction of the third tool half 121 is similar to that of the second tool half 102 described above, and the construction of the fourth tool half 122 is similar to that of the first tool half 101 described above. Therefore, with respect to a description of the detailed construction of the third tool half 121 and the fourth tool half 122 it is referred to the description of the second tool half 102 and the first tool half 101 above.

Embodiments of the invention have been described with the aid of the drawings. However, the invention is not limited to these embodiments, but rather many changes or variations are possible without departing from the technical teaching underlying the invention. Therefore, the scope of protection is defined by the appended claims.

What is claimed is:

1. An automated production line for the production of ophthalmic lenses, the production line comprising:
    a production line front end comprising:
        a first injection-molding machine arranged in the production line and configured to concurrently produce a plurality of front curve plastic lens molds (FCM) within a predetermined cycle time of less than ten seconds;
        a second injection-molding machine arranged in the production line and configured to concurrently produce a corresponding plurality of base curve plastic lens molds (BCM) within the same predetermined cycle time of less than ten seconds;
a casting module comprising:
   a filling station configured to dose a predetermined amount of lens-forming material into a predetermined number of the front curve plastic lens molds (FCM),
   a capping station configured to place a corresponding number of the base curve plastic lens molds (BCM) having the same age as the predetermined number of front curve plastic lens molds (FCM) on the predetermined number of front curve plastic lens molds (FCM) containing the predetermined amount of lens-forming material, to form a corresponding number of closed plastic lens molds (BCM/FCM) containing the lens-forming material;
a first transfer robot configured to transfer the corresponding number of closed plastic lens molds (BCM/FCM) containing the lens-forming material from the casting module to
a stacking module comprising
   a plurality of lens mold trays, each lens mold tray configured for being loaded with a multiple of the corresponding number of closed plastic lens molds (BCM/FCM) transferred by the first transfer robot and containing the lens-forming material,
   a stacking robot for stacking a plurality of lens mold trays loaded with the closed plastic lens molds containing the lens-forming material to form a stack of lens mold trays;
a curing module comprising
   a plurality of ovens,
   a stack handling robot,
   wherein each individual oven of the plurality of ovens comprises a heatable chamber sized to accommodate a said stack of lens mold trays carrying the closed plastic lens molds (BCM/FCM) as well as a door for opening and closing the chamber, to allow the stack handling robot to load a said stack of lens mold trays loaded with the closed plastic lens molds (BCM/FCM) containing the lens-forming material into the heatable chamber when the door is open, to allow the heatable chamber to be heated to a predetermined temperature to effect curing of the lens-forming material to form cured lenses (CL) in the closed plastic lens molds on the individual lens mold trays of the stack when the door is closed, and to allow the stack handling robot to remove a said stack of lens mold trays loaded with the closed plastic lens molds (BCM/FCM) containing the cured lenses (CL) from the chamber when the door is open again,
a destacking module comprising a destacking robot configured to destack the
individual lens mold trays from the stack of lens mold trays removed from the chamber of a said oven for allowing access to the closed plastic molds (BCM/FCM) of each individual lens mold tray;
a second transfer robot configured to transfer a predetermined number of the closed plastic lens molds (BCM/FCM) containing the cured lenses (CL) from a said individual lens mold tray to
a demolding and delensing module comprising:
   a demolding station configured to open the predetermined number of closed plastic lens molds (BCM/FCM) by separating the base curve plastic lens molds (BCM) and the front curve plastic lens molds (FCM) from each other, with the cured lenses adhering either to the base curve plastic lens molds (BCM) or to the front curve plastic lens molds (FCM),
   a delensing station configured to release the cured lenses (CL) from the base curve plastic lens molds (BCM) or from the front curve plastic lens molds (FCM),
   a transfer gripper (TG2) configured to transfer the cured lenses (CL) released from the delensing station to a treatment carrier tray;
a production line back end comprising:
   a treatment module for a liquid bath treatment of the cured lenses (CL) carried by the treatment carrier tray to obtain the ophthalmic lenses;
   an inspection module for the inspection of the ophthalmic lenses; and
   a primary packaging module for packaging those ophthalmic lenses that have successfully passed the inspection in primary packaging containers,
wherein the inspection module of the production line back end comprises:
   a closed-loop rail having a geometric shape that can be freely determined so as to fit in the space defined by a room where the closed-loop rail is arranged,
   a plurality of self-driving shuttles arranged on the closed-loop rail, each self-driving shuttle carrying a plurality of inspection cuvettes arranged thereon;
   a plurality of stations arranged along the closed-loop rail, the plurality of stations comprising the following individual stations arranged along the closed-loop rail in the following sequence:
      a cuvette filling station configured to fill the plurality of cuvettes with water, the plurality of cuvettes being arranged on a said shuttle in a handling position,
      a lens insertion station configured to insert the ophthalmic lenses transferred from the treatment module into the plurality of filled cuvettes arranged on the shuttles, one said ophthalmic lens into one said cuvette,
      a first cuvette tilting station configured to tilt the plurality of cuvettes arranged on the shuttle from the handling position to an inspection position,
      a lens inspection station configured to inspect the ophthalmic lenses in the plurality of cuvettes,
      a first cuvette tilting-back station for tilting the plurality of cuvettes containing the inspected ophthalmic lenses from the inspection position back to the handling position,
      an ophthalmic lens transfer station for transferring those inspected ophthalmic lenses that have successfully passed the inspection to the primary packaging module, and
      a cuvette cleaning station for sucking the water from the plurality of cuvettes.

2. The production line according to claim 1,
wherein the first injection-molding machine comprises a first tool half and a second tool half, the first tool half and the second tool half being movably arranged relative to one another between a closed position for injection-molding of the front curve plastic molds (FCM) and an open position for removal of the molded front curve plastic molds (FCM),
wherein the first tool half comprises a first tooling plate to which a plurality of individual first sleeves are pre-mounted, each of the individual first sleeves having an individual optical tool insert mounted thereto that determines the shape of a concave optical front surface of the front curve plastic lens mold (FCM) formed by the individual optical tool insert, and wherein the second tool half comprises a second tooling plate to which a plurality of individual second sleeves are pre-mounted, each of the individual second sleeves having an individual back piece insert mounted thereto that determines the shape of a convex back surface of the front curve plastic lens mold (FCM) formed by the individual back piece insert, wherein the first tool half further comprises a first slot accommodating the first tooling plate, the first slot allowing to mount the first tooling plate by sliding the first tooling plate into the first slot and then fixing the first tooling plate, and allowing to demount the first tooling plate by unfixing the first tooling plate and then pulling the first tooling plate out of the first slot, and wherein the second tool half further comprises a second slot accommodating the second tooling plate, the second slot allowing to mount the second tooling plate by sliding the second tooling plate into the second slot and then fixing the second tooling plate, and allowing to demount the second tooling plate by unfixing the second tooling plate and then pulling the second tooling plate out of the second slot;

and wherein the second injection-molding machine comprises a third tool half and a fourth tool half, the third tool half and the fourth tool half being movably arranged relative to one another between a closed position for injection-molding of the base curve plastic lens molds (BCM) and an open position for removal of the molded base curve plastic lens molds (BCM), wherein the third tool half comprises a third tooling plate to which a plurality of individual third sleeves are pre-mounted, each of the individual third sleeves having an individual optical tool insert mounted thereto that determines the shape of a convex optical front surface of the base curve plastic lens mold formed by the individual optical tool insert, and wherein the fourth tool half comprises a fourth tooling plate to which a plurality of individual fourth sleeves are pre-mounted, each of the individual fourth sleeves having an individual back piece insert mounted thereto that determines the shape of the concave back surface of the base curve plastic lens mold formed by the individual back piece insert, wherein the third tool half further comprises a third slot accommodating the third tooling plate, the third slot allowing to mount the third tooling plate by sliding the third tooling plate into the third slot and then fixing the third tooling plate, and allowing to demount the third tooling plate by unfixing the third tooling plate and then pulling the third tooling plate out of the third slot, and wherein the fourth tool half further comprises a fourth slot accommodating the fourth tooling plate, the fourth slot allowing to mount the fourth tooling plate by sliding the fourth tooling plate into the fourth slot and then fixing the fourth tooling plate, and allowing to demount the fourth tooling plate by unfixing the fourth tooling plate and then pulling the fourth tooling plate out of the fourth slot.

3. The production line according to claim 2, wherein the first tool half comprises a first fixed block comprising the first slot accommodating the first tooling plate to which the individual first sleeves are pre-mounted, a first alignment plate releasably mounted to the first fixed block, the first alignment plate being provided with a plurality of separate first through-openings, with each separate first through-opening of the first alignment plate accommodating therein one individual first sleeve of the plurality of individual first sleeves for aligning the one individual first sleeve, the first alignment plate being movable away from the first fixed block when being unmounted from the first fixed block to allow for sliding the first tooling plate into the first slot or pulling the first tooling plate out of the first slot;

and wherein the second tool half comprises a second fixed block comprising a plurality of hot runner pipes arranged therein for the injection of a thermoplastic material, the hot runner pipes extending out of the second fixed block towards the first tool half, a mounting plate releasably mounted to the second fixed block, the mounting plate comprising the second slot accommodating the second tooling plate with the pre-mounted individual second sleeves, the mounting plate, the second tooling plate and the individual second sleeves each comprising hot runner through-holes accommodating therein the hot runner pipes extending out of the second fixed block, the mounting plate being movable away from the second fixed block when being unmounted from the second fixed block to allow for sliding the second tooling plate into the second slot or pulling the second tooling plate out of the second slot, a second alignment plate movably mounted towards and away from the mounting plate, the second alignment plate being provided with a plurality of separate second through-openings, with each separate second through-opening accommodating therein one individual second sleeve of the plurality of individual second sleeves for aligning the one individual second sleeve.

4. The production line according to any one of claim 2 or 3, wherein the third tool half comprises a third fixed block comprising a plurality of hot runner pipes arranged therein for the injection of a thermoplastic material, the hot runner pipes extending out of the third fixed block towards the fourth tool half, a mounting plate releasably mounted to the third fixed block, the mounting plate comprising the third slot accommodating the third tooling plate with the pre-mounted individual third sleeves, the mounting plate, the third tooling plate and the individual third sleeves each comprising hot runner through-holes accommodating therein the hot runner pipes extending out of the third fixed block, the mounting plate being movable away from the third fixed block when being unmounted from the third fixed block to allow for sliding the third tooling plate into the third slot or pulling the third tooling plate out of the third slot, a third alignment plate movably mounted towards and away from the mounting plate, the third alignment plate being provided with a plurality of separate third through-openings, with each separate third through-opening accommodating therein one individual third sleeve of the plurality of individual third sleeves for aligning the one individual third sleeve;

and wherein the fourth tool half comprises a fourth fixed block comprising the fourth slot accommodating the fourth tooling plate to which the individual fourth sleeves are pre-mounted, a fourth alignment plate releasably mounted to the fourth fixed block, the fourth alignment plate being provided with a plurality of separate fourth through-openings, with each separate fourth through-opening of the fourth alignment plate accommodating therein one individual fourth sleeve of the plurality of individual fourth sleeves for aligning the one individual fourth sleeve, the fourth alignment plate being movable away from the fourth fixed block when being unmounted from the fourth fixed block to allow for sliding the fourth tooling plate into the fourth slot or pulling the fourth tooling plate out of the fourth slot.

5. The production line according to claim 1, wherein the production line front end further comprises:
   a front curve plastic lens mold buffer module arranged between the first injection-molding machine and the casting module, the front curve plastic lens mold buffer module being configured to store the front curve plastic lens molds (FCM) removed from the first injection-molding machine for a first predetermined cooling time period at predetermined environmental conditions until the front curve plastic molds (FCM) are transferred to the casting module;
   a base curve plastic lens mold buffer module arranged between the second injection-molding machine and the casting module, the base curve plastic lens mold buffer module being configured to store the base curve plastic lens molds (BCM) removed from the second injection-molding machine for a second predetermined cooling time period at the same predetermined environmental conditions as the front curve plastic lens molds (FCM) until the base curve plastic lens molds (BCM) are transferred to the casting module;
   wherein the casting module is configured to have the same predetermined environmental conditions as have the base curve plastic mold buffer module and the front curve plastic mold buffer module, and wherein the capping station is configured to place only such base curve plastic lens molds (BCM) onto the front curve plastic lens molds (FCM) for which the same time period has elapsed between the removal of the front curve plastic lens molds (FCM) from the first injection-molding machine and the removal of the base curve plastic lens molds (BCM) from the second injection-molding machine.

6. The production line according to claim 1, wherein the casting module further comprises a toric angle verification station arranged downstream of the capping station, the toric angle verification station comprising a camera.

7. The production line according to claim 1, wherein the demolding and delensing module comprises one or both of
   a front curve demolding and delensing branch for opening the closed plastic lens molds (BCM/FCM) containing the cured lenses (CL) and for picking the cured lenses (CL) up from the front curve plastic lens molds (FCM);
   a base curve demolding and delensing branch for opening the closed plastic lens molds (BCM/FCM) containing the cured lenses (CL) and for picking the cured lenses (CL) up from a temporary carrier;
      wherein the front curve demolding and delensing branch comprises
      a lens pre-release station comprising mechanical stamps for pressing against the back surface of the base curve plastic lens (BCM) molds to release the cured lenses (CL) from the base curve plastic lens molds (BCM),
      the demolding station for opening the plastic lens molds (BCM/FCM), and
      the delensing station, the delensing station comprising pins for pressing against the back surfaces of the front curve plastic lens molds (FCM) to release the cured lenses (CL) from the front curve plastic lens molds (FCM), to allow the released cured lenses (CL) to be transferred by the transfer gripper (TG2) to the treatment carrier tray;
   wherein the base curve demolding and delensing branch comprises
      the demolding station for opening the closed plastic lens molds (BCM/FCM),
      the demolding station comprising pins for pressing against the back surfaces of the front curve plastic lens molds (FCM) to release the cured lenses (CL) from the front curve plastic lens molds (FCM);
      the delensing station comprising receiver grippers arranged beneath the base curve plastic lens molds (BCM) and ultrasonic horns for applying ultrasonic waves to the back surfaces of the base curve plastic lens molds (BCM) to release the cured lenses (CL) from the base curve plastic lens molds (BCM) and allow them to be received by the receiver grippers arranged beneath the base curve plastic lens molds (BCM), to allow the received cured lenses (CL) to be transferred by the transfer gripper (TG2) to the treatment carrier tray.

8. The production line according to claim 1, wherein the treatment module of the production line back end (2) comprises:
   a treatment carrier tray stacking station for stacking a plurality of individual treatment carrier trays one above the other to form a stack of treatment carrier trays carrying the cured lenses (CL);
   a plurality of treatment baths, each treatment bath of the plurality of treatment baths comprising a tank sized to accommodate a said stack of treatment carrier trays and containing a treatment liquid selected from the group of water, an organic extraction liquid, a coating liquid, or mixtures thereof;
   a handling robot configured to pick the stack of treatment carrier trays and to place the said stack of treatment carrier trays into a first treatment bath of the plurality of treatment baths for a predetermined period of time, further configured to remove the said stack of treatment carrier trays from the first treatment bath after the predetermined period of time and lift the stack of treatment carrier trays to a position above the tank of the first treatment bath, further configured to tilt the lifted stack of treatment carrier trays about a pivot shaft with the tilted stack of treatment carrier trays still being arranged above the tank of the first treatment bath to allow the treatment liquid remaining in the stack of treatment carrier trays to flow back from the tilted stack of treatment carrier trays into the tank of the first treatment bath, further configured to tilt the lifted stack of treatment carrier trays back, and further configured to move the stack of treatment carrier trays from the first treatment bath to a second treatment bath of the plurality of treatment baths or to an ophthalmic lens transfer station where the individual treatment carrier trays of the stack of treatment carrier trays are destacked and the ophthalmic lenses obtained by the liquid bath treatment of the cured lenses (CL) are transferred from the destacked individual treatment carrier trays to the inspection module.

9. The production line according to claim 1, wherein the inspection module further comprises the following stations arranged between the lens insertion station and the first cuvette tilting station:
- an initial cuvette tilting station for tilting the cuvettes containing the ophthalmic lenses inserted in the lens insertion station to the inspection position,
- an inversion detection station configured to detect whether or not an ophthalmic lens contained in the cuvette is inverted,
- an initial tilting-back station for tilting the cuvettes back to the handling position,
- a re-inverting station for re-inverting ophthalmic lenses which are inverted.

* * * * *